United States Patent Office 3,720,659
Patented Mar. 13, 1973

3,720,659
SULFATED GUMS AND METHOD OF
PRODUCING SAME
Kenneth B. Guiseley, South Hope, and Philip A. Whitehouse, Rockport, Maine, assignors to Marine Colloids, Inc., Springfield, N.J.
No Drawing. Continuation-in-part of application Ser. No. 848,700, Aug. 8, 1969. This application Feb. 9, 1971, Ser. No. 114,072
Int. Cl. C08b 19/02, 19/12
U.S. Cl. 260—209.5        36 Claims

ABSTRACT OF THE DISCLOSURE

A carbohydrate gum is subjected to anhydrous sulfation with a sulfating agent in the form of a reaction product of sulfur trioxide with a Lewis base. The gum is produced in a water-containing, water-distended condition by coagulation from solution or by swelling in an aqueous medium and water and any liquid irreversibly reactive with the sulfating agent are replaced by a surrogate liquid that has a vapor pressure substantially lower than that of water and any other liquid carried by the particles that is irreversibly reactive with the sulfating agent, said surrogate liquid being miscible with the water and with said other liquid, by slurrying the particles with the surrogate liquid and evaporating the liquid medium until the water and any reactive liquid are removed but leaving surrogate liquid associated with the particles. The surrogate liquid is either the same as or is miscible with the solvent that is used for the sulfating agent. The process is one having general applicability to carbohydrate gums so as to impart improved receptivity to sulfation without excessive degradation. Degradation also is minimized by carrying out the sulfation in the presence of a base. Predetermined degrees of sulfation are made possible by temperature control and new sulfated gum products are afforded which may be produced so as to have properties having specific utilities for different commercial applications, the end products having especial advantages for use in milk products.

This is a continuation-in-part of application Ser. No. 848,700 filed Aug. 8, 1969 and now abandoned.

FIELD OF THE INVENTION

The invention relates to the sulfating of gums and relates more particularly to sulfating carbohydrate gums.

BACKGROUND OF THE INVENTION

It has been known heretofore that various polysaccharides may be sulfated by a reaction wherein one or more of the hydroxyls, in effect, is replaced by the sulfate group $\cdot O \cdot SO_3^-$ using various types of sulfating agents. Depending upon the polysaccharide under consideration, the average number of hydroxyls per sugar residue is not always the same. Thus guar, locust bean gum, starch and cellulose have an average of 3 hydroxyls per sugar residue and complete sulfation would be expressed as a DS of 3. Algin and pectin have only 2 hydroxyls per sugar residue and complete sulfation would result in a DS of 2. For gum arabic, the value lies between 2 and 3.

Various types of polysaccharide have been subjected to sulfation such as cellulose, pectin, amylopectin, amylose, and algin. The sulfation has been carried out both in non-aqueous systems and in aqueous systems. In non-aqueous sulfation systems sulfating agents have been employed such as the reaction product between N,N-dimethylformamide (DMF) and $SO_3$ (DMF:$SO_3$) in solution with anhydrous DMF (U.S. Pat. Nos. 3,200,110; 3,349,078; and 3,401,160; British 1,110,335); triethylamine sulfur trioxide dissolved in DMF (Whistler et al., Arch. Biochem. Biophys., 95, 36–41 (1961)); chlorosulfonic acid in solution with pyridine (U.S. Pat. Nos. 2,599,564 and 3,271,388); dimethylsulfoxide containing sulfur trioxide (Whistler et al., Arch. Biochem. Biophys., 121, 358–363 (1967)); and formamide:$SO_3$ (Swiss Pat. No. 305,572). In aqueous systems sulfating agents have been used such as aqueous solution of sodium hydroxide with trimethylamine sulfur trioxide and with or without the further addition of sodium sulfate (U.S. Pat. Nos. 2,786,833; 2,967,178 and 3,077,373).

In the prior processes sulfation has been accomplished approaching the theoretical maximum but while claims have been made to the retention of molecular structure of the precursive gum in large measure, it has been practical experience that the attainment of sulfation has been attended with attack on the precursive molecular structure such that the resulting reaction products have not afforded commercially useful products having stabilizing and gel-forming properties analogous to these properties as possessed by a naturally occurring sulfated polysaccharide hydrocolloid such as carrageenan. Polysaccharides such as locust bean gum, guar and starch are much more plentiful and consequently sell at considerably less cost than carrageenan extractive and a process of successfully sulfating such gums with such retention of molecular structure that the addition of sulfate groups imparts suspending and gelling properties resembling those of carrageenan has considerable commercial significance. However, while the attainment of such properties has been described, so far as is known sulfated gums of the kind in question which acceptably possess such properties have not been commercially known.

GENERAL STATEMENT AS TO OBJECTS
OF INVENTION

It is an object of this invention to accomplish substantial sulfation of carbohydrate gums with retention in large measure of the molecular structure of the precursive gum whereby improved properties including water suspension and milk reactivity are imparted.

It is a further objective of this invention to provide a method of sulfating such gums wherein predetermined degrees of sulfation may be attained for providing properties desired in the sulfation product for specific fields of utility.

It is a further object of this invention to provide new sulfated gum reaction products having utility in food, cosmetics, industrial and other products.

BRIEF STATEMENT AS TO THE NATURE
OF THE INVENTION

It is one of the features of this invention that a carbohydrate gum is provided in solid state in such condition as to be amenable to sulfation with minimal attack on the molecule and one of its unique advantages is its general applicablility to the different carbohydrate gums.

In the practice of this invention gum particles are subjected to sulfation in the presence of a sulfating agent in the form of the product of reaction between $SO_3$ and a Lewis base dissolved in a solvent therefor and one of the principal features of this invention whereby the aforesaid objectives may be attained resides in the production of the gum particles so as to impart the property of ready susceptibility to sulfation by the sulfating agent without excessive degradation and loss of viscosity-imparting properties. When effecting sulfation with a sulfating agent of the character aforesaid, the sulfation must be carried out under anhydrous conditions for if any water is present it is highly reactive with the $SO_3$, which is reversibly held by the Lewis base, to form sulfuric acid and to the extent that this occurs the $SO_3$, which might otherwise effect sulfation of the gum, is taken out of the reaction zone and the sulfuric acid which is produced thereby is capable of degrading the gum. Accordingly, in utilizing a sulfating agent of the character aforesaid, it is essential that the gum particles be substantially free of water. Moreover, the reaction mass must be free of any other material such as a lower aliphatic alcohol having the property of readily and irreversibly reacting with the $SO_3$ in the sulfating agent. If particles of a carbohydrate gum are air dried preliminarily to sulfation, they do not have the property of being readily sulfated and, if sulfatable at all, the sulfation is attended with such excessive degradation as to render the product of no practical value. This is the case whether or not the gum may have been dried from a swollen or otherwise distended condition.

It has been found, according to this invention, that carbohydrate gum particles can be produced in such form as to be readily susceptible to sulfation by first causing the gum to occur in the form of water-containing, water-distended particles, forming a slurry of the particles in a water-miscible surrogate liquid which does not enter into an irreversible reaction with the sulfating agent, which is miscible with or is essentially the same as the solvent for the sulfating agent and which has a vapor pressure lower than that of water. Upon subjecting the slurry to conditions under which evaporation of the volatile liquid occurs the water content of the particles can be caused to be substantially completely removed and it has been found that when the water is removed in this way and replaced by retained surrogate liquid the resulting substantially anhydrous gum is in such condition that it becomes sulfated very readily without excessive degradation of the polymeric molecular structure or that there is an even further opening up of the molecular structure whereby sulfated gums may be obtained having higher viscosities than the unsulfated gums from which they were made. Of course, the particles that are subjected to sulfation also should be free of any substance other than water that reacts irreversibly with the sulfating agent, and it is a further advantage of this invention that if the moist gum particles have associated therewith some liquid other than water such as a lower aliphatic alcohol which has a vapor pressure higher than that of the surrogate liquid, removal thereof along with the water is effected during the evaporation. The slurried particles should be free of any liquid or other substance that is irreversibly reactive with substantial amounts of the sulfating agent and which by reason of having a vapor pressure the same as or less than the surrogate liquid would not be removed during evaporation.

The gum particles may be produced in different ways so as to occur in water-containing, water-distended condition. According to a more specific aspect of the invention which very effectively affords the desired distended condition of the particles, the gum is caused to be dissolved in an aqueous medium to provide a liquid solution of the gum and the gum is caused to be thrown out of aqueous solution with formation in an aqueous medium of a particulate coagulum, the word "particulate" being used in a broad sense as covering any of the possible particle shapes which may be formed, including fibrous particles. Ordinarily the coagulation is accomplished by adding the gum solution to a water-miscible hydrophilic liquid in which the gum is insoluble to form a medium in which the gum coagulates. However, the coagulation may be effected in other ways, as will be described more in detail hereinbelow.

Alternatively, particles of the gum may be caused to take up water and become distended without going into solution. This is caused to occur in the presence of sufficient aqueous medium to prevent the swollen particles from excessively agglomerating. In the case of the more readily soluble gums the particles can be caused to become swollen without dissolving or undue agglomeration by employing a blend of water and a hydrophilic liquid in which the gum is insoluble.

While this invention is not to be regarded as dependent upon the theory disclosed herein as that which contributes to the improved susceptibility to sulfation afforded according to this invention, it is believed that by coagulating the gum from a liquid solution thereof or by causing the gum to swell or otherwise become distended the polymeric complexes of the precursive gum are opened up, although this favorable condition of the gum can be lost as by drying in a conventional manner as a preliminary to sulfation. However, it appears to be the case that if the particles while still wet are slurried with a surrogate liquid which is water-miscible, which has a vapor pressure substantially lower than water, and which is one in which the sulfating agent is soluble or is one which is comprised in a solvent for the sulfating agent, the water is gradually eliminated during the evaporation and becomes replaced by the surrogate liquid in such a way that the gum retains its susceptibility to sulfation.

The removal of the water or other reactive liquid by evaporation in the presence of the surrogate liquid having a lower vapor pressure is to be contrasted with drying the water-distended gum in some other way such as air drying or washing with a hydrophilic non-solvent for the gum in the absence of the surrogate liquid followed by soaking or suspending the gum in a surrogate liquid which may or may not be used as the solvent for the sulfating agent. It is important that the drying be accomplished by evaporation of the water or other reactive liquid and that this be carried out in the presence of the surrogate liquid. It is the maintenance of these conditions in contemporaneous combination that has been found to have general applicability in the conditioning of the various carbohydrate gums whereby greatly improved results are obtainable in the sulfation of these gums.

This invention also pertains to the conditions under which the sulfation is carried out and it is one of the features and advantages of the practice of this invention that by preselecting the temperature at which the sulfation is carried out the DS may be predetermined in order to obtain properties desired for a particular commercial application, which temperature usually varies from room temperature to about 100° C.

It is a further feature of this invention that before commencing the sulfating reaction a base preferably is included in an amount which preferably is between one and two moles per mole of sulfating agent, the amount normally used being somewhat more than one mole per mole of the sulfating agent. By causing the gum particles to be subjected to the sulfating action of the sulfating agent in the presence of the base the tendency of the sulfating agent to attack the molecular structure of the gum is greatly reduced. While it is preferable that the base be present in the amounts above mentioned, lesser quantities are beneficial in reducing degradation of the gum molecules.

The presence of the base during sulfation tends to decrease the degree of sulfation that is attainable in the absence of the base, but this lesser degree of sulfation is offset by a very substantial diminution of the degradation of the gum that occurs during sulfation and permits the attainment of sulfated carbohydrate gums having remarkably high viscosity-inducing characteristics as well as sulfation. In fact, in some instances the viscosity-inducing characteristics of the sulfated gum may be very considerably greater than those of the unsulfated gum.

Because the technique of evaporation of water from a water-distended gum in the presence of a surrogate liquid greatly improves the capacity of a gum to become sulfated the employment of a base during sulfation is especially advantageous in combination with the aforesaid evaporation technique in that one is enabled to obtain a very high order of sulfation in combination with high viscosity-inducing caracteristics. However, in those instances wherein sulfation can be successfully accomplished in the presence of the base in the absence of the aforesaid evaporation preconditioning technique in the presence of a surrogate liquid, very substantial lessening of degradation, as evidenced by increased viscosity-producing characteristics, is afforded and this improvement in itself is one of the features and aspects of this invention.

After completion of the sulfating reaction the excess reaction medium is removed from the sulfated particles and the sulfated gum is recovered either by dissolving it in water followed by coagulation or by suspending the sulfated particles in a liquid medium in which they are insoluble and in which the residual sulfating medium is soluble.

DETAILED DESCRIPTION OF THE INVENTION

Typical gums which may be subjected to sulfation in the practice of this invention are gums that in the natural state are substantially or entirely free of sulfate groups such as locust bean gum, guar, tara, gelatinized starch, agarose, cellulose, carboxymethyl cellulose, gum arabic, psyllium mucilage and pectin. However, the invention also lends itself to sulfating a carbohydrate gum that may already contain sulfate groups if in its natural state the gum does not afford the properties suitable for a particular use and it is desired to increase the sulfate content of the gum. The gum may be subjected to the procedure of this invention either in the crude form or after removal of impurities as, for example, by clarification.

When the water-containing, water-distended gum is produced by first forming a solution of the gum and then effecting its coagulation the concentration of the gum solution is not critical, the principal limiting factor being presented by the tendency of most carbohydrate gums to form highly viscous solutions. If the solution becomes extremely viscous, it is inconvenient to handle. For example, in the case of guar, if the concentration exceeds about 3% the solution become difficult to handle without the aid of a powerful mixer. On the other hand, a 20% solution of gum arabic ordinarily has a viscosity under 100 cps. More generally, the gum solution is initially produced at a concentration such that it can be readily handled in preparing it and in effecting coagulation of the gum. In the case of gums which produce solutions of high viscosity concentrations of the order of 1% have been found to be especially suitable. In the case of a gum such as gum arabic a solution of the order of 10% to 13% has been found to be especially suitable. Most of the carbohydrate gums are soluble in water either in the cold or with the aid of heat. In the case of cellulose, solution can be promoted by the presence of a cuprammonium salt.

Coagulation of the gum solution ordinarily is effected by the addition of the gum solution to a hydrophilic liquid which is completely miscible with water and in which the gum is insoluble in such manner that when the addition has been effected the concentration of the hydrophilic liquid will be such as to cause coagulation of the gum. The hydrophilic liquid to which the gum solution is added for effecting the coagulation may be one which is reactive with the sulfating agent or one which is inert to the sulfating agent. For reasons of economy one usually employs a lower aliphatic alcohol or ketone such as isopropyl alcohol, methanol or acetone. Other examples of hydrophilic liquids of this type are ethanol, tertiary butyl alcohol and tetrahydrofuran. In any case, the vapor pressure of a hydrophilic liquid of this type should be greater than the vapor pressure of the surrogate liquid with which the coagulum is slurried in accomplishing removal of the water by vaporization so as to enable the hydrophilic liquid to be eliminated prior to the sulfation step.

When the hydrophilic liquid that is employed is essentially inert to the sulfating medium it may be a tertiary amine such as pyridine or an amide such as DMF. When the hydrophilic liquid is of this type it is suitable to serve as the surrogate liquid that is present during the removal of water by evaporation from the slurry of the gum with the surrogate liquid. Other examples of this type of hydrophilic liquid are formamide and dimethyl sulfoxide.

The type of hydrophilic liquid that is employed for activation precipitation affects, to a small extent, the DS that is obtainable under otherwise similar conditions. Thus in the case of locust bean gum the DS obtainable when employing DMF is somewhat greater than if an alcohol were to be used. On the other hand, methanol is conductive to obtaining a higher DS than DMF when activating guar or starch for sulfation.

In usual practice, 1 volume of the gum solution is added to about 1.5 to 2 volumes of the hydrophilic liquid. Because of the cost of recovering the hydrophilic liquid it is uneconomical to increase the volumes of the hydrophilic liquid so as to use more than the minimum required. However, more may be employed. When about 9 volumes of the hydrophilic liquid were employed per volume of the gum solution, the DS obtainable was somewhat less than when the amount of the hydrophilic liquid was close to the minimum for effecting coagulation of the gum.

In the case of a carbohydrate such as cellulose which is put into aqueous solution with the aid of a cuprammonium salt, coagulation can be effected by the addition of the gum solution to a liquid medium which induces coagulation such as a dilute aqueous acid solution.

After the coagulation is effected residual liquid is separated from the coagulated gum while leaving the gum wet. This may be accomplished by draining which may be aided by squeezing the coagulum, care being taken to leave the coagulum wet and not to destroy the extended fibrous character of the coagulated gum.

The occurrence of the gum in a water-containing, water-distended state is afforded with optimum effectiveness by the expedient of dissolving the gum in a water solution and causing the gum to coagulate in an aqueous medium under conditions such that the coagulum occurs in particulate form. However, this necessarily involves the handling of relatively large volumes of liquid and necessitates the recovery of the hydrophilic coagulating liquid. It is a further advantage and feature of this invention that effective sulfation also can be accomplished when the carbohydrate gum is merely caused to occur in a swollen or water-distended state if thereafter the gum particles are slurried, while in water-containing, water-distended condition, with a surrogate liquid and if volatile liquid is evaporated from the slurry until the water is substantially completely removed while still having some of the surrogate liquid associated with the distended gum particles. When particles of carbohydrate gum become swollen they also have a tendency to become agglomerated. However, by proper relation of the aqueous medium with which the gum particles are contacted and the amount thereof, agglomeration such as to interfere with water removal can be avoided. In the case of a gum such as guar, the gum tends to go into solution due to the fact that guar is water-soluble if attempt is made to employe enough water to maintain the guar in a particulate condition. If the amount of water is reduced, then there is a tendency to agglomerate, but it has been found that this tendency can be minimized by using a mixture of water and a hydrophilic liquid such as alcohol or DMF from which the gum particles take up water to induce swelling, but without excessive agglomeration. Preferably the amount of hydrophilic liquid may be adjusted to afford the desired properties. For example, when DMF constitutes over about 40% of a water-DMF mixture, the DS of a gum such as guar falls off rapidly. When the concentration of isopropyl alcohol exceeds about 60% the DS also is low. On the other hand, in the absence of the hydrophilic liquid or if too little is used in attempting to produce guar gum in a swollen condition without dissolving it, the gum is reduced to a condition such that removal of the water becomes difficult.

After the gum has been produced in a water-containing, water-distended condition, excess aqueous medium is removed, but, as before, the gum particles are maintained so as to contain associated water when they are made up into a slurry with the surrogate liquid. In the usual case the gum particles contain sufficient water to weigh two or three times the weight of the completely dry gum.

After the gum particles have been produced in the water-containing, water-distended condition it has been found that a high degree of receptivity to sulfation without excessive degradation can be had if the water and any other reactive material are removed from the gum by slurrying the gum with the surrogate liquid and evaporating the volatile material until the water and any material such as alcohol is substantially completely removed but leaving the surrogate liquid in substantial amount. The preferred surrogate liquid is DMF. Other suitable surrogate liquids are pyridine, formamide, dimethyl sulfoxide, dimethylacetamide, diethylformamide, the picolines and the lutidines. As above noted, it is essential that the surrogate liquid be water-miscible and have a vapor pressure lower than that of water and lower than that of any material such as a lower aliphatic alcohol which may have to be removed by evaporation along with the water. Ordinarily the surrogate liquid is the same as the solvent for the sulfating agent used during sulfation. However, this is not necessarily the case. Thus it is possible to use pyridine as the surrogate liquid but if this were the case pyridine could not be employed as the solvent for the sulfating agent if attempt were made to employ pyridine:$SO_3$ as the sulfating agent inasmuch as pyridine:$SO_3$ is not soluble in pyridine. However, if pyridine is used as the surrogate liquid and is partially removed during the evaporation of the moisture, the sulfation may be accomplished using DMF as the solvent for the sulfating agent and DMF:$SO_3$ as the sulfating agent, any retained pyridine being beneficial in the sulfation reaction for reasons hereinbelow mentioned. However, if the surrogate liquid is not the same as the solvent for the sulfating agent it may be miscible with the solvent for the sulfating agent.

The evaporation step preferably is carried out under a vacuum of about 5 mm. of mercury and at an elevated temperature of about 80° C. The vacuum conditions are not essential but without vacuum the evaporation takes longer and if the absence of any vacuum is compensated for by maintaining a higher temperature, precautions have to be taken to prevent local overheating. The vacuum condition and elevated temperature are merely for the purpose of accelerating removal of the water and any of the liquid having a vapor pressure greater than that of the surrogate liquid.

The evaporation step is carried out until there has been removal from the gum particles of substantially all of the water and any liquid that is irreversibly reactive with the sulfating agent and that has a vapor pressure greater than that of the surrogate liquid. As will be brought out below in connection with Example 9, when the DS is maintained at an essentially constant level, the viscosity of the sulfated gum is increased as the water level in the reagents and precursor gum is decreased.

As regards the amount of the surrogate liquid that is left associated with the gum particles, it should be substantial for if virtually all of the liquid medium in which the gum particles are slurried is removed the capacity to be sulfated is lost or greatly impaired. However, this is not to say that the evaporation may not be carried on until the surrogate liquid no longer occurs in a freely flowable state, e.g., so as to constitute about one-half the weight of the gum. The surrogate liquid tends to replace the aqueous medium initially responsible for the gum being in a water-containing, water-distended condition and the gum may be reduced to a corresponding swollen or distended condition wherein it is swollen or distended by the surrogate liquid and in this condition can be retained even though any freely flowable surrogate liquid has been removed by evaporation.

The amount of the surrogate liquid with which the gum is slurried is not critical so long as enough is present so that the water may be removed to desired completeness while at least some of the surrogate liquid remains associated with the gum for the reasons above stated. It usually is sufficient if the surrogate liquid covers the slurried particles.

The preferred sulfating agent is the reaction product between DMF and sulfur trioxide (DMF:$SO_3$) dissolved in excess DMF when the surrogate liquid is DMF. However, other known sulfating agents may be employed such as the reaction products of tertiary amines with sulfur trioxide such as pyridine:$SO_3$, trimethylamine:$SO_3$, and triethylamine:$SO_3$. Reaction products of sulfur trioxide and amides other than DMF also may be employed such as dimethylacetamide, formamide, and diethylformamide. More generally, any sulfating agent may be used which is an anhydrous reaction product between sulfur trioxide and a Lewis base.

The nature of the liquid surrogate has been disclosed hereinabove and any of them may be employed as the solvent for the sulfating agent subject to the proviso that it be a liquid that is a solvent for the particular sulfating agent that is employed and that it is essentially inert with respect to the gum and the sulfating agent.

The quantity of the sulfating agent should be at least sufficient in terms of theoretical equivalents for affording the desired DS. Little in the way of excess is required.

As disclosed hereinabove, the sulfating reaction is preferably carried out in the presence of a base that is at least partially soluble in the reaction medium. The base may be an organic base, preferably a tertiary amine such as pyridine. Other examples are triethylamine, quinoline, the picolines and the lutidines. The selection of a base is not limited to nitrogenous organic compounds, and certain other substances have been found to be effective and are especially desirable from the point of view that they may be selected from odorless, edible, and less expensive chemical compounds. Their prime requisite is that they be capable of accepting a proton from the reaction mixture to produce an acid which is weaker than that formed in the reaction between the carbohydrate gum and sulfur trioxide. On the other hand. the base must not be so strong as to react irreversibly with the sulfur trioxide complex employed as the sulfating reagent. As examples, suitable compounds of this type are sodium acetate and disodium hydrogen phosphate. Of course, other salts may be used, such as potassium and calcium acetate or potassium phosphate. In the case of sodium acetate, when sulfation takes place, sodium polysaccharide sulfate and acetic acid are formed, but acetic acid is a weak, only slightly ionized acid and does not cause appreciable degradation of the polysaccharide, whereas without any base, the product of the reaction would be polysaccharide sulfuric acid which is much more ionized and is a much stronger acid capable of seriously degrading the polymer. In the case of disodium phosphate, the reaction products are sodium polysaccharide sulfate and monosodium phosphate. Other salts possessing similar reactivity are known by those skilled in the art and may be used as suitable bases.

During the sulfating reaction 1 mole of the sulfating reagent reacts with sugar to produce 1 mole of acid and the base which is employed according to this invention takes up the liberated acid as it is formed with resultant lessening of degradation of the polysaccharide during the sulfating reaction. The minimum amount of base which preferably is employed equals 1 mole for each mole of the sulfating agent that enters into the reaction. The base can be caused to be present in either of two ways. If the sulfating agent is the product of combining a tertiary amine with $SO_3$, then the tertiary amine serves as the base in that as the $SO_3$ becomes transferred to the gum during the sulfation reaction, the tertiary amine becomes available for reaction with acid that is liberated during the reaction. In other words, when the sulfating agent is a complex formed between a tertiary amine and $SO_3$, the complex itself is such as to cause 1 mole of base to be present and available for reaction during sulfation. If, on the other hand, the sulfating agent is the reaction complex between DMF and $SO_3$ then, since DMF is not basic enough to combine with protons released during sulfation, it is necessary in order for 1 mole of base to be present and available for reaction to add 1 mole of a base such as pyridine or disodium phosphate. The sulfating agent that is in the form of a complex formed between $SO_3$ and DMF or other amide in a solvent therefor is substantially more effective in accomplishing the sulfation of a gum than the complex formed between $SO_3$ and a tertiary amine and in certain instances a sulfation may be accomplished in the case of a gum which has not been preconditioned by the aforesaid technique of removal of water by evaporating it in the presence of a surrogate liquid; but sulfation under such conditions is conducive to extensive degradation of the gum. When under such circumstances the amount of sulfation is such as not to be offset excessively by the presence of a base, the extent of degradation can be very substantially reduced in the practice of this aspect of this invention by carrying out the sulfation using the $SO_3$:amide sulfating agent in the presence of a base.

While effort normally is made during the evaporation step prior to the sulfation step to reduce water and any hydrophilic liquid reactive with the sulfating agent such as isopropyl alcohol to a minimum, there may be a small amount of the reactive hydrophilic liquid that is present and that is reactive with the sulfating agent to produce 1 mole of acid per mole of sulfating agent. If all of the sulfating reagent were to react with water 2 moles of organic base would be sufficient to react with liberated acid and the presence of 2 moles of base per mole of sulfating agent represents the theoretical maximum to cope with such as situation, although a further excess would do no harm. Actually it is desirable to reduce any water or other irreversibly reactive hydrophilic liquid to a minimum and in practice, in order to compensate for any slight retention of water or other irreversibly reactive liquid that may be present, to employ somewhat more of the base than 1 mole of the base per mole of the sulfating agent, it being understood that at least 1 mole of the base may be present in the sulfating agent when the sulfating agent is the complex reaction product between $SO_3$ and a tertiary amine. More generally, it is desirable when employing a base during sulfation that the base be present in sufficient amount to react with acid produced by the reaction of the sulfating agent with active hydroxyl groups in the reaction mass which are contained in the gum or which may be present in any slight amount of water or other retained liquid that is reactive with the sulfating agent. The sulfating agent is reactive with any such active hydroxyl groups with a corresponding release of protons. The base preferably is present in an amount which is at least approximately equal to that which reacts with the protons so released. While it normally is preferable in the practice of this invention to minimize degradation by providing for the presence of a base during the sulfation reaction, its presence is not essential when practicing other features of this invention. As exemplified below, if the base is omitted greater degradation may be expected than is the case if a base is provided during the sulfation reaction. For some applications such degradation is permissible. Moreover, by providing varying amounts of base less than 1 mole per mole of sulfating agent, the amount of degradation is subject to control and degradation of the gum is lessened to the extent that protons released during the sulfating reaction are accepted by the base.

In performing the sulfating step, the sulfating agent is added to the anhydrous slurry of the coagulated gum containing the base when a base is present, precautions being taken to prevent access of any moisture during the reaction period. The slurry is subjected to mild agitation while the reaction is taking place.

It has been found that when practicing this invention temperature plays a critical role as regards the DS that is obtainable, other conditions remaining the same. For example, when sulfation of locust bean gum was carried out at room temperature the maximum DS obtained was about 0.5 whether the amount of sulfating agent was only slightly in excess of the amount theoretically required for obtaining this DS or was several times that amount. Moreover, the upper DS limit remained substantially the same whether the reaction period was only a few hours or was continued for many more hours. However, if the gum is subjected to prolonged exposure to sulfating conditions it tends to become degraded to some extent. At higher temperatures the same phenomena are exhibited except that the DS is substantially higher, namely, about 1.0, when the sulfation of locust bean gum was carried out at 70° C. and about 2.24 when the reaction was carried out at 90° C.

The aforesaid feature of this invention is significant for the properties of the sulfated gum which vary considerably depending on the DS attained by the gum and one DS or another may be especially desirable for particular commercial applications. Highly useful new properties are acquired by the gum when the DS ranges from about 0.1 to the theoretical maximum for the gum in question. Whenever it is desired to produce a sulfated gum so as to have a DS which imparts properties that are especially suitable for a given commercial application the sulfation is carried out at the temperature which, for the gum in question, establishes the preselected DS as the upper sulfating limit under the sulfating conditions employed and in the presence of at least the theoretical amount of sulfating agent corresponding with the preselected DS. In this way sulfated gums may be produced to preselected DS values under effective control. It is more difficult to control the DS of a gum by other expedients such as limiting the quantity of sulfating agent or the duration of the reaction period.

In most cases it is desirable to accomplish the sulfation with only slight degradation or other attack on the molecular structure of the gum and it is one of the features and advantages of this invention that this objective has been successfully accomplished. However, as the temperature of the sulfating reaction is increased with resulting increase in DS there is some degradation of the molecular structure but even under such conditions new and valuable properties are obtained. If, on the other hand, it is desired to utilize this invention in accomplishing sulfation with concomitant degradation of the gum the sulfation may be carried out at more elevated temperatures and/or in the partial or complete absence of a base. Thus locust bean gum contained in a slurry prepared for sulfation as hereinabove described was subjected to sulfation utilizing DMF:$SO_3$ dissolved in DMF as the reaction medium in the presence of and also in the absence of pyridine and the sulfated gum product in each case was analyzed to determine the DS and was tested for viscosity when contained in a 1% solution at 25° C. The results are shown in the following table:

| Sulfating conditions | With pyridine | | Without pyridine | |
|---|---|---|---|---|
| | DS | Viscosity, cps. | DS | Viscosity, cps. |
| 4 hours, room temperature | 0.46 | 1,300 | 0.47 | 250 |
| 4 hours, 45° C | 0.65 | 800 | 0.76 | 9 |

In addition to illustrating the importance of the presence of the organic base in preventing serious impairment of the sulfated gum's viscosity-imparting capacity, the foregoing data also illustrate the effect of increase in temperature in increasing the DS limit. While the capacity to impart high viscosity fell off to some extent when the sulfation was carried out at the higher temperature, the viscosities indicated in the foregoing table are good and are regarded as being superior to those which are possible when obtaining a corresponding DS by prior known procedures.

After the sulfating reaction has been carried to desired completeness, conditions are controlled so as to recover the sulfated gum with minimal attack on its molecular structure. The bulk of any residual sulfating agent preferably is removed by draining the reactive liquid from the sulfated gum coagulum. While not essential, the coagulum may be washed with a liquid that is inert to the sulfating agent such as an additional quantity of the surrogate liquid used as the reaction medium for the sulfating agent. The sulfated gum coagulum is dissolved in water which contains an indicator such as phenol-phthalein or BDH Universal Indicator, or a device for determining pH electrically so that a suitable alkaline material such as sodium hydroxide may be added to maintain the solution approximately neutral. Other alkaline materials also may be used such as sodium carbonate or bicarbonate or the carbonate or hydroxide of potassium, ammonium or calcium. The addition of alkali also releases, if present, any residual pyridine or other base from the sulfated gum, this being especially desirable in the case of pyridine which is malodorous.

After the gum has been dissolved in water the resulting solution, which preferably has been rendered slightly alkaline, e.g., at a pH of about 8, is added to a volatile hydrophilic liquid which preferably is a lower aliphatic alcohol such as isopropanol or acetone at the rate of about 1 part of the solution to 1.5 to 2.5 parts hydrophilic liquid. The resulting coagulum then is washed with additional hydrophilic liquid, for example, 60-85% alcohol or acetone. It may then be dried in any convenient way and ground to pulverulent form. Instead of dissolving the sulfated gum particles after their initial separation from the residual sulfating liquid, the particles may be suspended in a water-miscible liquid in which they do not dissolve such as isopropyl alcohol containing sufficient aqueous base to neutralize the acidity of the gum particles as initially recovered.

Sulfated gums produced in the practice of this invention have been found to possess a desirable range of viscosity-producing and milk-reactive properties which may be varied depending on the DS and which may be predetermined by the selection of reaction conditions. The sulfated gums are essentially non-gelling and find utility as a replacement for lambda carrageenan in preparations containing lambda-rich carrageenan. Moreover, when there is an application for lambda carrageenan or similar material but that which is available does not possess quite the proper characteristics, the present invention lends itself to the sulfation of another gum to obtain a gum having the desired properties. It is one of the advantageous features of this invention that it enables land plant carbohydrate gums that are substantially free of sulfate groups to be converted by sulfation so as to have valuable properties not possessed by the precursive gum and vary the imparted properties according to the intended utility.

The practice of this invention permits the sulfation of gums of the character aforesaid whereby substantial sulfation is afforded while retaining desired viscosity-producing characteristics. The viscosity-producing characteristics tend to move to lower levels after reaching a maximum as the degree of sulfation is increased and as the degree of sulfation is increased water solubility and ionic activity tend to increase.

The synthetic sulfation of a gum so as to have properties especially adapted for particular commercial products and uses may be illustrated in connection with guar and locust bean gum each of which was sulfated to effect incremental increases in DS. Solutions of the unsulfated gums and the sulfated gums were prepared at 1% concentration by heating the gums and water with vigorous agitation in a boiling water bath for fifteen minutes, then cooling to 25° C. and adjusting the weight, if necessary, by adding back water lost by evaporation. Viscosity measurements were made on a Brookfield Model LVF viscometer at 6 r.p.m., selecting an appropriate spindle according to normal practice. When water viscosity is mentioned hereinafter and in the claims the viscosity is measured under the conditions described unless otherwise stated. The viscosities at the different incrementally increased DS values are given in the following table:

TABLE I

| Guar (unsulfated) | | Locust bean gum (unsulfated) | |
|---|---|---|---|
| DS | Viscosity, cps. | DS | Viscosity, cps. |
| 0 | 6,600 | 0 | 3,000 |
| 0.36 | 6,600 | 0.35 | 1,600 |
| 0.60 | 3,925 | 0.44 | 1,150 |
| 0.87 | 3,150 | 0.59 | 830 |
| 0.97 | 2,150 | 0.94 | 595 |
| 1.16 | 1,350 | 0.94 | 400 |
| 1.51 | 1,200 | 1.08 | 475 |
| 1.79 | 710 | 1.35 | 340 |
| | | 1.65 | 300 |

The smooth transition toward lower viscosities at higher levels of DS is apparent from the foregoing table. The gums are rendered more soluble by the introduction of the ester sulfate group. In the case of locust bean gum at a DS above about 0.6 it was found that the viscosity was subtsantially the same whether the mixture was stirred at room temperature or was heated. While unsulfated guar possesses cold water solubility, the rate of solubility in cold water was rendered substantially greater by sulfation. Locust bean gum does not possess cold water solubility and the production of sulfated locust bean gum having cold water solubility constitutes an unusual and useful feature of this invention.

More generally, it is possible in the practice of this invention in the case of guar and locust bean gums to effect sulfation whereby for DS values from about 0.3 to about 1.8 the viscosity value of a 1% water solution at 25° C., while decreasing progressively from that of the dissolved unsulfated gum, does not when the DS becomes increased to about 1.8 become less than about one-tenth that of the unsulfated gum. When locust bean gum and guar are subjected to sulfation in accordance with this invention it has been found that for DS values between about 0.1 and about 0.3 the viscosity characteristics of the gum actually may be increased as compared with those of the precursor gum. As exemplified herein below (Example 12) this viscosity increase may be as much as three- or fourfold.

In the practice of this invention the sulfation may be controlled to produce predetermined relationship of DS and viscosity having special utility for specific applications. For example, carboxymethyl cellulose and carrageenan are commonly used in toothpaste formulations to provide a stable paste of smooth consistency. Conventional guar gum is unsuited for this purpose because it fails to make a smooth paste. However, guar sulfate having a DS of 0.36 and having a viscosity of 6600 cps. served very well for use in a toothpaste formualtion. Moreover, it possessed some advantages over usual binders in that toothpaste formulated using the sulfated guar was found to withstand heat shock in that no gelation occurred when the toothpaste formulation was cooled to room temperature after being held at 120° F. for three days. The consistency of the cooled toothpaste was essentially identical with that of a control that had remained at room temperature throughout the test. As conventionally formulated, toothpaste usually contains one or more abrasive substances, a humectant, a surface-active agent, a binder, flavoring oil, a preservative, and a sweetener. More specifically, the toothpaste formulation referred to above was as follows:

|  | Grams |
| --- | --- |
| Dicalcium phosphate | 270 |
| Calcium carbonate | 18 |
| Glycerin | 156 |
| Water | 132.6 |
| Sodium lauryl sulfate | 9 |
| Sodium guar sulfate | 5 |
| Flavoring oil | 6 |

With increased degrees of sulfation there is increased ionic activity which imparts properties that are associated with lambda carrageenan, especially milk reactivity that makes carrageenan so valuable in the milk industry. The sulfated gums of this invention have been found to be very well suited as stabilizing agents effective to prevent settling of cocoa particles in chocolate-milk beverages and likewise to impart desirable physical properties. The sulfated land plant hydrocolloids produced in accordance with this invention have been found to be well suited for use in compoistions which are intended to be added to cold milk. One compoistion extensively sold for this purpose is a chocolate syrup containing cocoa particles, sugar or other sweetening agent and a stabilizer dispersed in sufficient water to provide a syrup consistency. The syrup is formulated so that when added to a given quantity of milk the cocoa and sweetening agent will impart desired flavor and enough stabilizing agent to prevent excessive settling of the cocoa particles and to impart creaminess and desirable mouth-feel. Compositions in dry particulate form also are extensively sold containing cocoa particles, sweetening agent and a stabilizer. The dry composition is merely added to cold milk and dissolved in the milk with the aid of agitation. For a composition of this the stabilizing agent must be one that is soluble in cold milk.

Utility for use in milk products of the character aforesaid may be illustrated by guar which has been sulfated in the practice of this invention to provide a DS of 1.79 with so little degradation that the viscosity of a 1% solution at 25° C. is about 710 cps. When the sulfated guar was added to a standard chocolate-milk syrup in an amount to make the guar sulfate level 450 p.p.m. when the syrup was added to milk to produce a chocolate-milk beverage and the milk was stored overnight at 50° F. absolutely no settling of cocoa particles could be detected. The chocolate milk also was completely smooth and had excellent mouth-feel and flavor release. Its viscosity measured in a Zahn cup was 46 seconds. The Zahn cup viscosity measurement is that which is widely used in the dairy industry to measure the viscosity characteristics of a chocolate-milk drink. The cup that was used was the Krim-Ko type cup having a 0.089" diameter orifice. By comparison, a commercial sample of carrageenan used at 500 p.p.m. gave similar properties and a flow time of 40 seconds. Guar having a lower DS and higher viscosity also may be used but in order that the chocolate milk may have the viscosity characteristics regarded as preferable the DS should be at least about 0.87 and the viscosity should not exceed about 3150 cps.

By way of further example, locust bean gum having a DS of 1.35 and a water viscosity of 340 cps. when used so as to occur at a level of 450 p.p.m. yielded a chocolate milk which exhibited no settling and had a viscosity of 43 seconds as measured in a Zahn cup.

In the preparation of a milk shake mix guar sulfate having a DS of 1.79 and a water viscosity of 710 cps. has proved to be considerably more effective than carrageenan. Thus carrageenan is ordinarily used at a level of 0.5 gram in the cocoa-sugar mixture intended for use with 8 ozs. of milk to provide foam stabilization, cocoa suspension and development of a rich, creamy mouth-feel. When employing the sulfated guar it was found necessary to reduce the quantity to 0.1 gram to obtain identical properties.

More generally, this invention enables the successful sulfation of land plant carbohydrate gums which are incapable of preventing the settling of cocoa particles in a chocolate-milk preparation so as to render them effective for preventing such settling when dispersed in the preparation at a concentration of not over 0.1% by weight of the preparation.

It is apparent from the data contained in Table I that in the practice of this invention desired properties for different commercial applications can be afforded by control of the degree of sulfation under given conditions of sulfation. If it is desired to vary the water viscosity at a given DS this may be accomplished by varying the temperature at which sulfation is effected. Thus, whereas the guar sulfate of the foregoing table having a DS of 1.79 and a viscosity of 710 cps. was produced by sulfation at 70° C., sulfation at 95° C. under otherwise similar conditions until the DS was 1.74 resulted in a guar sulfate having a water viscosity of 74 cps. Morevore, if the viscosity-imparting property of a sulfated gum produced in the practice of this invention is regarded as too high it may be reduced by methods commonly used by those skilled in the art such as acid hydrolysis, oxidation with hydrogen peroxide or sodium hypochlorite, or simply extended heating.

In order to impart in a significant amount properties that are different and useful as compared with the properties of the unsulfated gum, the DS of the sulfated gum should be at least about 0.1 and the most widely useful combinations of properties usually are afforded when the DS does not exceed about two-thirds of the theoretical maximum. The viscosity-inducing properties of the sulfated gum depend largely on those of the precursive gum. Thus, guar is extremely effective in affording high viscosity when present in small amount and it has been pointed out above that the effectiveness of guar in affording high viscosity may be retained in very large measure when the sulfation is carried out in accordance with this invention. On the other hand, a gum such as gum arabic has very little viscosity-inducing properties, whether unsulfated or sulfated.

EXAMPLES

The nature and practice of this invention is further disclosed and illustrated in connection with the following examples.

In the examples as well as elsewhere herein the DS is calculated in accordance with the following expression in the case of gums such as guar, locust bean and cellulose where the polysaccharide is a complex of hexose units containing three hydroxyl groups per hexose unit:

$$N = \frac{162S}{9600 - 102S}$$

wherein N is the degree of substitution (DS) of the sodium salt of the sulfated gum and S is percent $SO_4$.

For polysaccharides having different equivalent weights or a different number of hydroxyls a more general expression must be employed for calculating the DS of the sodium salt, namely, $$N = \frac{\text{Formula weight} \times \text{percent } SO_4}{9600 - (102 \times \text{percent } SO_4)}$$

the formula weight being the molecular weight of the repeating molecular unit which characterizes and is comprised in the complex.

Example 1

A 10.8-gram portion of commercially available locust bean gum was dissolved in water to provide a solution of substantially 1% concentration by dispersing the gum in water and heating the water until the gum dissolved. The hot solution was poured with stirring into 2 volumes of DMF after adding sodium chloride to the aqueous solution to a concentration of about 0.1% to aid precipitation of the gum. The fibrous coagulum was separated from the bulk of the liquid by draining and was then squeezed to remove as much liquid as possible. The firm mat of fibers was shredded into a flask and DMF added to essentially cover the fibers. The resulting slurry was subjected to vaccum distillation, using a water bath in which the temperature gradually rose from ambient to about 80° C. to remove virtually all of the water and most of the DMF. The pressure in the system was about 5 mm. during this process. To the activated gum was added 125 ml. of 1 M DMF:$SO_3$ in DMF (1.88 moles per mole of hexose) and 36 ml. of pyridine (stoichiometrically equivalent to 3.65 times the number of moles of DMF:$SO_3$) and the resulting slurry maintained at room temperature for 24 hours, with occasional gentle agitation. The flask remained closed throughout this period in order to maintain a dry, i.e., water-free, atmosphere within. Upon expiration of the reaction period the sulfated gum coagulum was separated from the liquid reaction medium by filtration, and the coagulum was washed twice with DMF. The coagulum was then dispersed in room-temperature water with agitation, whereupon it began to dissolve immediately. A few drops of 1% phenol-phthalein indicator were added followed immediately by 1.0 N sodium hydroxide solution until a pink color was produced, showing that the solution was no longer acidic. (A pH meter could have been used for the same purpose.) As the pink color faded (as more gum dissolved rendering the solution again acidic), further additions of sodium hydroxide were made to maintain neutral to slightly basic conditions. When the gum had dissolved nearly completely, the solution was warmed, sodium chloride added to 0.1% concentration, and the sodium locust bean gum sulfate precipitated from solution by addition to 99% isopropyl alcohol at a rate of 1 volume of solution to 2 of alcohol. The concentration of the neutralized product at the time of precipitation was about 1.6%. The coagulated gum was separated from the excess liquid by straining, then was squeezed and shredded into enough 85% isopropyl alcohol to adequately cover it. It was later separated from this wash liquid, washed again similarly twice, again separated, and dried in a 60° C. circulating air oven. The yield of recovered product was 20.7 grams. It was ground to a pulverulent state.

The sulfated gum thus prepared was found to have a DS of 1.65, and a 1% solution in water had a viscosity of 300 cps. as determined by a Brookfield Model LVF viscometer at 6 r.p.m. using a #2 spindle.

A cold process chocolate milk was made with this product, at a level of 350 p.p.m. in the finished milk. It had a flow time of 40.0 seconds and no settling of cocoa resulted.

Later, the sulfation was repeated, using 5.4 grams of locust bean gum, and altering the amounts of other materials proportionately, except for the DMF:$SO_3$ and pyridine which were changed (on a molar basis) to provide a ratio of 3 moles of sulfating reagent per mole of hexose and 2 moles of pyridine per mole of DMF:$SO_3$; 100 ml. of 1 M DMF:$SO_3$ in DMF and 16 ml. of pyridine were used. The product had a DS of 1.67 and a 1% water viscosity of 310 cps. and when it was used in a cold process chocolate milk at 350 p.p.m. it gave a flow time of 38.5 seconds and there was no settling of the cocoa.

While this example is generally illustrative of the practice of this invention, it also demonstrates the fact that at given conditions of temperature and time there is a limitation on the DS which is attainable, for the DS obtained remained essentially the same even though the molar ratio of sulfating agent to hexose was increased from 1.85 to 3. This example also demonstrates the reproducibility of the sulfating reaction that is afforded according to the present invention.

Example 2

This example demonstrates the control over DS which is brought about by control of the temperature at which the sulfation is carried out. Activated locust bean gum coagula were prepared by the method described in Example 1, except that 99% isopropyl alcohol was substituted for DMF in the initial precipitation step. After squeezing out the excess liquid, the coagula were mixed with DMF and the solvents removed by vacuum distillation. The coagula were then treated at different temperatures with enough sulfating reagent in each case to produce a DS of 3.0. All were treated for 4 hours. The manner of work-up was as described in Example 1. The conditions and results of the experiments are presented in the following table:

| Experiment | Weight LBG, grams | Milliliter of 1 M DMF:$SO_3$ | Milliliters pyridine | Rxn. temperature, degrees | Yield, grams | DS |
|---|---|---|---|---|---|---|
| A | 5.4 | 100 | 16 | 25 | 5.65 | 0.46 |
| B | 21.6 | + 400 | 64 | 45 | 25.27 | 0.65 |
| C | 10.8 | 200 | 32 | 70 | 14.88 | 0.99 |
| D | 5.4 | 100 | 16 | >90 | 12.74 | 2.24 |

Example 3

The effect of varying the hydrophilic liquid used for the precipitation upon the ultimate DS achievable under otherwise identical conditions may be illustrated by the following table depicting the results obtained with potato starch. In each case 5.4 grams of potato starch was mixed with cold water and the resulting slurry added to 500 ml. of boiling water. Heating was continued briefly until no appreciable further thickening was observed. The mixture was cooled somewhat and added to the hydrophilic liquid precipitant indicated at a rate of 1 volume of starch sol to 2 volumes of precipitant liquid. Flocculation and coagulation of the starch took place and the supernatant was decanted. The coagulated starch was pressed out and covered with DMF. The mixture was subjected to vacuum distillation on an evaporator which caused the flask to revolve, thus providing constant agitation. When the water, the hydrophilic liquid used for coagulation, and nearly all of the DMF had been removed, the activated starch was subjected to sulfation with an amount of DMF:$SO_3$ (dissolved in DMF) sufficient to totally sulfate the starch, i.e., produce a starch sulfate having a DS of 3. As before, an amount of pyridine stoichiometrically equivalent to twice the number of moles of DMF:$SO_3$ used was added. The reaction mixture was allowed to stand at room temperature for 24 hours. The sulfated gum was separated from the reaction mixture, washed with DMF and added to water, with good agitation. Phenol-phthalein indicator was added and 1 N sodium hydroxide sufficient to maintain a pink coloration. When dissolution and neutralization were nearly complete the solution was heated and sodium chloride admixed with it to a concentration of 0.1%. The solution was added to twice its volume of 99% isopropyl alcohol effecting the precipitation of sodium starch sulfate, which was subsequently washed twice with 85% isopropyl alcohol, dried at 60° C. in a circulating air oven, and ground to a pulverulent form. The comparative data of these experiments is as follows:

| Sample | Hydrophilic liquid | DS |
|---|---|---|
| A | DMF | 0.31 |
| B | Acetone | 0.57 |
| C | Isopropyl alcohol | 1.37 |
| D | Methanol | 1.65 |

Example 4

A 1% aqueous solution of 5.4 grams of locust bean gum was added to twice its volume of 99% isopropyl alcohol and the coagulated gum after separation from the supernatant liquid was prepared for sulfation by treatment with DMF followed by vacuum removal of any water and alcohol as described in the preceding examples. A solution of 18.1 grams of triethylamine-sulfur trioxide in 100 ml. of DMF was prepared and added to the activated gum. The mixture was heated to 70° C. and that temperature maintained for four hours while the reaction mixture was gently agitated. At the end of the reaction time the sulfated locust bean gum, now as the triethylammonium salt, was separated from the excess liquid, washed with DMF, dispersed in water and neutralized with sodium hydroxide. After coagulation in isopropyl alcohol, washing, drying, and grinding as described above, there was obtained 8.39 grams of sodium guar sulfate which contained 43.28% ester sulfate. The DS was calculated to 1.35 and the viscosity of a 1% water solution determined as aforesaid was 340 cps. The sulfated gum was suitable for cocoa suspension in cold-process chocolate milk at a level of 450 p.p.m. The chocolate milk exhibited no settling and had a viscosity of 43 seconds as measured in a Zahn cup.

This example illustrates the employment of a sulfating agent with which the addition of a base is not necessary in order to provide for the presence of a base during the sulfation reaction because the sulfating agent is the reaction product between a tertiary amine and $SO_3$ and because the tertiary amine on a mole-for-mole basis is liberated as the $SO_3$ is transferred to the sugar molecular structure of the gum, as explained hereinabove, to accept the proton removed from the hydroxyl of the sugar molecule, as expressed by the following general reaction:

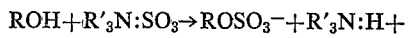

where ROH represents the sugar molecule and the tertiary amine is expressed as $R'_3N:$.

Example 5

Although degradation occurs at higher temperatures, it is not necessarily to the detriment of the finished product. To illustrate this point, 20 grams of guar was dissolved in about 2 liters of water and precipitated from solution with isopropyl alcohol. The coagulum was pressed out and dehydrated by vacuum distillation with DMF. A mixture of 59 ml. of pyridine and 370 ml. of 1 M DMF:$SO_3$ in DMF was added to the activated gum and the reaction mixture treated at boiling water bath temperature for 4 hours. The liquid was then separated from the sulfated guar and after washing the gum was dissolved in water with constant neutralization with 1 N sodium hydroxide. The solution was heated, then added to twice its volume of isopropyl alcohol to effect precipitation of the product. After being washed twice with 60% isopropyl alcohol and once with 85%, the sodium guar sulfate was dried and ground, to yield 41.4 grams of free-flowing powder. Although the 1% viscosity of the product was only 13 cps., it is significant that with over 50% sulfate plus over 12% sodium associated with the ester sulfate group, the actual polymer concentration in the test solution was only about 0.38%. The DS of the product was 2.19. The product was tested for its value as a toothpaste binder and a stabilizer in cold-process chocolate milk and was found to be unsuitable for these purposes. However, it was also tested in a milk shake application which normally requires 0.5 gram of carrageenan. To produce comparable results (no cocoa settling, good volume and good foam retention) only 0.3 gram of the sodium guar sulfate was required. This is another instance of these materials being used at the same or lower levels than products now in use. This example also demonstrates that by control of viscosity and DS, products can be tailor-made to fit an application.

Example 6

In the preceding examples employing galactomannan gums, no effort was made to remove the insoluble matter normally present in such materials. However, the procedure is not limited to the raw gum, and one is not denied the privilege of obtaining a product which will form a perfectly clear solution. This can be brought about by either of two methods—sulfating the clarified gum or clarifying the sulfated gum. The similarity in results obtained by the two methods is illustrated here with locust bean gum, although other gums which do not form clear solutions after sulfation may be treated similarly. (Starch and cellulose sulfates form bright solutions provided that the DS is high enough, whereas guar and locust bean gum sulfates do not.)

(A) Ten grams of locust bean gum were dissolved in 800 ml. of water by boiling for 30 seconds, and the solution diluted with an additional 200 ml. of water. The solution was filtered, using 20 grams of Hyflo Super-Cel filter aid, namely, a filter aid of the diatomaceous earth type, and the combined filtrate and cake rinse added to a one and one-half-fold volume of 99% isopropyl alcohol after the addition of 1% by volume of 10% sodium chloride to the combined aqueous solutions. The resulting fibrous coagulated gum was pressed as dry as possible and placed in a round-bottomed flask after shredding. Anhydrous DMF (94 grams) was added and the mixture subjected to vacuum distillation to remove all but about 17 grams of DMF. For sulfation, a solution of 23.5 ml. of pyridine in 145 ml. of 1 M DMF:$SO_3$ in DMF was added to the activated gum and the mixture held at 70° C. for 4 hours. A 3:1 molar ratio of sulfating reagent to hexose was used to see how high a DS could be attained at 70° C. to compare with the material described in part B of this example. (The yield of clarified gum was assumed to be 78% of the starting material, or 7.8 grams, for this calculation.) To simplify analytical work, the following technique was employed in working up the reaction mixture. (In practice, such washings may be deleted—they would only serve to increase the cost of the process.) The sulfated gum was filtered off, washed with DMF to remove the bulk of residual unreacted sulfating reagent and then washed with 99% alcohol. These washings prevented the accumulation of inorganic sulfate in the final product. The washed gum was then dispersed in water containing some universal indicator and immediately neutralized with 1 N sodium hydroxide. Frequent additions of base maintained the pH at a safe (6–9) level. When the gum was completely dissolved, the clear solution was warmed and added to 1.5 volumes of 99% alcohol to effect precipitation of the product, which then received two washes in 85% alcohol and was dried at 60° C. and ground to a pulverulent form.

(B) A solution of 7.8 grams of locust bean gum in 1 liter of water (to approximate the conditions employed in part A with respect to gum concentration) was treated as in the above examples to provide an activated coagulum, which was subjected to sulfation as in part A—145 ml. of 1 M DMF:$SO_3$ in DMF with 23.5 ml. of pyridine. After sulfation, washing, dissolution and neutralization, 20 grams of Hyflo Super-Cel was incorporated into the hot solution, and the mixture was filtered. The cake was washed, sodium chloride was added to the combined filtrate and washings, and the whole added to 1.5 volumes of 99% alcohol, effecting precipitation of the gum, which was then washed and dried in the manner described for the product is part A.

The two materials were compared for appearance, DS, and water viscosity. As can be seen from the following table, little difference existed:

|  | A | B |
|---|---|---|
| Yield, grams | 13.3 | 12.4 |
| Color | White | White |
| DS | 1.25 | 1.41 |
| Appearance of 1% solution | Clear, colorless | Clear, colorless |
| Viscosity of 1% solution, cps | 456 | 360 |

Example 7

Although cellulose can be sulfated with a slurry of DMF:SO$_3$ in DMF, this reaction generally produces materials having a high DS (i.e., 2–3). However, the use of 1 M DMF:SO$_3$ solution in DMF to sulfate cellulose is quite ineffective when the cellulose is in a commonly available form. The practice of this invention wherein effective gum activation is accomplished by precipitation from aqueous solution may be further illustrated in connection with the preparation of freshly precipitated cellulose from an aqueous solution thereof. This was accomplished by dissolving cotton batting in cuprammonium hydroxide solution and adding this solution to an aqueous hydrochloric acid solution.

A solution of 64 ml. of concentrated aqueous ammonia was diluted to about 270 ml. with water and this solution slowly added to a solution of 122 grams of copper sulfate (CuSO$_4$·5H$_2$O) in 600 ml. of water. The cupric hydroxide which was precipitated was centrifuged off and washed once with water, again centrifuging to recover the precipitate. The latter was then dissolved in 633 ml. of concentrated aqueous ammonia and the solution diluted to 1 liter to give a solution containing 31 grams of copper/liter and 165 grams of ammonia/liter.

Under a nitrogen atmosphere, 8.1 grams of cotton was dissolved in 250 ml. of the copper reagent just prepared. The resulting viscous solution was added, with good agitation, to a solution of 245 ml. of concentrated hydrochloric acid diluted to 3 liters. The precipitated cellulose was separated from the liquor, and washed twice with water. The second wash did not give a precipitate when treated with silver nitrate solution, demonstrating the absence of chlorides and thus adequate washing.

The wet cellulose (92 g.) was covered with 200 ml. of DMF. An acidic reaction was observed when some of the mixture was treated with universal indicator. Pyridine was added to make the mixture neutral, then the volatile substances were removed in vacuo until 212 ml. of distillate had been collected. The index of refraction of the distillate indicated that some water still remained in the fibers. An additional 100 ml. of DMF was mixed with the cellulose and vacuum distillation resumed. When the residual DMF and cellulose weight had been reduced to 93 grams, the material was considered ready for sulfation.

To this activated cellulose were added 16 ml. of pyridine and 100 ml. of 1 M DMF:SO$_3$ in DMF (enough to produce a DS of 2 if all were consumed by the gum). Some heat was given off, indicating the possibility that water may still have remained in the cellulose. After the reaction mixture stood for 24 hours at room temperature the liquid was removed by filtration, and the solid washed with DMF and then with absolute ethanol to remove residual unreacted sulfating reagent if any remained. The gum was dispersed in water and 1 N sodium hydroxide solution added to maintain slightly alkaline conditions as evidenced by a green color imparted by the universal indicator.

Insoluble particles were removed from the solution when no further dissolving occurred. These (product B) were water-washed and the washings added to the original filtrate which was then added to twice its volume of 99% alcohol to precipitate the readily water soluble portion (product A). Three volumes of 99% alcohol were added to the slushy material designated product B. The two products were separated from the supernatant alcohol, washed with 70% alcohol twice, and dried.

Analyses showed that product A had a DS of 1.04 and product B had a DS of 0.78. Product A dissolved readily but formed a hazy solution having a 1% viscosity (measured at 25° C. with a Brookfield Model LVF viscometer using the #2 spindle at 6 r.p.m.) of 1850 cps. Product B swelled rapidly in water but did not dissolve completely. Under the same conditions as product A (except using the #4 spindle) its viscosity was 21,000 cps.

Product A, by virtue of its good balance of DS and viscosity, would be expected to behave similarly to carrageenan in applications; product B has very unusual properties having utility for new applications. For example, it demonstrated extreme shear sensitivity, and although its viscosity was 21,000 cps. as noted above, at 6 r.p.m., it was only 3600 cps. at 60 r.p.m., and when a similar viscometer (Model LVT) with a greater range of speeds was used at 0.3 r.p.m., the measured viscosity was 200,000 cps. Certain types of suspension applications could well be served by a material with viscosity properties such as these.

Example 8

This example illustrates the controlled degree of sulfation that is possible in the practice of this invention. The procedure was designed to introduce sulfate ester into agarose to the extent of one sulfate group per disaccharide unit, thus producing a polysaccharide having a chemical analysis essentially the same as that of Gloiopeltis mucilage (funoran, a very valuable seaweed extract used in the Orient). The physical properties—viscosity in particular—would not be expected to be similar because of the low molecular weight of agarose.

Agarose was prepared in the manner disclosed in U.S. Pat. No. 3,281,409, including coagulation of purified agarose solution by its addition to isopropanol and washing with isopropanol, but without drying. The mat of agarose isolated prior to drying is representative of coagulated gums used for sulfation as described herein. More specifically, a mixture of 36 grams of Hyflo Super-Cel, 12 grams of agar, and 2.4 grams of carrageenan was added to 800 ml. of water with agitation and the mixture heated to boiling for 5 minutes. To this was added 200 ml. of 5% benzethonium chloride solution. When precipitation was complete, the mixture was filtered and the cake washed with hot water, adding the rinse to the filtrate. This was then added to 1.5 times its volume of 99% isopropyl alcohol. After gentle agitation the short fibers were allowed to settle, whereupon a moderately firm mat formed. When cool, the mat was lifted out of the alcohol, squeezed out, and washed three times with 60% isopropyl alcohol to remove the residual quaternary ammonium salt. The mat, damp with the aqueous alcohol was shredded into 200 ml. of DMF whereupon it dissolved almost immediately. The volatile liquids were removed in vacuo until all free liquid was removed and the residue was taken up in 80 ml. of DMF. To this were added 4.5 ml. of pyridine and 100 ml. of 0.275 M DMF:SO$_3$ in DMF (a 10% excess). This amount was selected on the basis of the usual yield (ca. 66%) of agarose obtained from the particular lot of agar used. Thus, the amount of agarose in the mat was calculated to be about 7.9 grams, or 7.9/0.306=25 meq. of agarobiose units containing one primary alcohol function per agarobiose. The reaction with 25 meq. of sulfating reagent is believed to occur at the primary alcohol site, producing a derivative containing the following repeating structure after neutralization with sodium hydroxide:

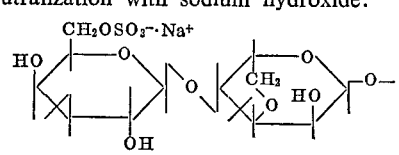

Such a polymer would contain 23.28% sulfate on an anhydrous basis.

After the sulfation mixture had stood 16 hours at room temperature with intermittent shaking, anhydrous methanol (10 ml.) was added to react with any unused sulfating agent that might remain. After two more hours, ice and water were added, along with a few drops of universal indicator. This was immediately followed by sufficient 1 N sodium hydroxide to maintain neutrality. The solution was added to twice its volume of 99% isopropyl alcohol. The gum coagulum was separated from the alcoholic solution and washed three times with 60% isopropyl alcohol and once with 85% alcohol, then dried at 60° in a circulating air stream and ground to a powder. On a moisture-free basis, the sodium agarose sulfate had a sulfate content of 25.52%, or about 10% excess of that anticipated, showing that the reaction was so complete that even the excess sulfating reagent was consumed by the polysaccharide. The product described in this example differed from ordinary agarose in that it was cold-water soluble and did not gel.

The infrared spectrum of the sodium agarose sulfate was obtained and compared with that of Gloiopeltis mucilage. The near identity of the two spectra strongly suggests that Gloiopeltis extract is essentially sulfated agarose, although the high viscosity of Gloiopeltis extract (ca. 270 cps. at 1%, 25° C.) indicates it to have a markedly higher molecular weight than the sodium agarose sulfate described here (ca. 270 cps. at 1%, 25° C.). The sulfate content of the Gloiopeltis polysaccharide was determined to be 24.7% (as the sodium salt).

Example 9

In the preceding examples, polysaccharide sulfates have been prepared using a number of different gums, sulfating reagents, etc., with just a normal amount of care to keep anhydrous conditions, that is, extreme cautions were not employed. Accordingly, the viscosities of the finished products are not regarded as maximal.

A series of experiments was carried out so as to leave a varying amount of moisture in the activated coagulum by removing the DMF and aqueous alcohol to different extents. The same amount of essentially the same sulfating reagent (a known excess—2 moles DMF:SO₃ per mole of hexose with 2 moles pyridine per mole DMF:SO₃, the reaction conditions being such that a DS of about 1.25 should be obtained) was added to each. At the end of the reaction period the supernatant liquid was analyzed for residual sulfating reagent and for free sulfuric acid (as the pyridine salt). From the known amount of sulfuric acid present in the sulfating reagent used and from the amounts formed by residual water in the gum coagulum the total amount present was calculated. The viscosities of the isolated products were plotted against the total meq. of sulfuric acid present in order to extrapolate to zero acid concentration so that an estimate could be made of the maximum attainable viscosity for the DS under consideration. The following table provides the pertinent data, and an extrapolation from the points to zero sulfuric acid concentration indicates that it may be possible by very careful control of conditions, to prepare sodium guar sulfate having a DS of about 1.25 and a viscosity (1%, 25° C.) of about 5000 cps., whereas in ordinary practice a viscosity of about 1700 cps. would be expected:

| Milliequivalent of H₂SO₄ present— | | | | |
|---|---|---|---|---|
| Arising from DMF:SO₃ solution | From H₂O in gum | Total | 1% H₂O viscosity, cps. | DS |
| 5.23 | 5.17 | 10.4 | 2,375 | 1.27 |
| 5.24 | 6.96 | 12.2 | 2,175 | 1.27 |
| 5.22 | 13.18 | 18.4 | 1,725 | 1.22 |
| 5.27 | 19.13 | 24.4 | 1,525 | 1.24 |

This example illustrates that by control of the moisture content of the activated gum a measure of control is possible regarding the viscosity of the finished product.

Example 10

To illustrate that temperature of reaction plays a larger role than time of reaction, the sulfation of guar at 70° C. and 90° C. with an excess of sulfating reagent for times varying from 0.5 hour to 4.0 hours were used. In each case, guar gum was prepared for sulfation as hereinabove disclosed and treated with 3 moles of the sulfating reagent previous described, namely, DMF:SO₃ with about 2 moles of pyridine per mole of DMF:SO₃, for each mole of hexose present, each hexose unit containing 3 hydroxyl groups. Thus, sufficient reagent was present in each case to completely sulfate the gum to a DS of 3.0. At each temperature there was a leveling-off with time, showing that the temperature controlled the DS to a much greater measure than did time. The results are presented in the following table:

| 70° C. | | 90° C. | |
|---|---|---|---|
| Time, hours | DS | Time, hours | DS |
| 0.5 | 0.87 | 0.5 | 1.77 |
| 1.0 | 0.97 | 1.0 | 1.74 |
| 2.0 | 1.08 | 2.0 | 2.09 |
| 3.0 | 1.16 | 3.0 | 2.32 |
| 4.0 | 1.24 | 4.0 | 2.19 |

Example 11

Four gums were selected from the stockroom shelf, and after dissolution, precipitation and dehydration by distillation with DMF, treated with an amount of sulfating reagent calculated to provide a DS such that new and valuable properties would be conferred upon the gums in their sulfated state. Because of minor differences in the pretreatment of the gums, they are discussed individually up to the sulfation step. Sulfation conditions are presented in tabular form. Work-up of the sulfated gum was as previously described—filtration, dissolution, neutralization, and alcohol precipitation.

(A) Carboxymethylcellulose (CMC, Hercules Powder Co.) (10.9 grams) was dissolved in room-temperature water to make a 1% solution. Sodium chloride was added to a concentration of 0.1% and the solution was mixed with 1.63 volumes of isopropyl alcohol, effecting precipitation of the gum. Liquid was pressed out, leaving 28.6 grams of wet gum which was shredded into a round-bottomed flask and covered with 88 grams of DMF. The volatile liquids were removed in vacuo to a condition approaching dryness but leaving the particles distended with residual DMF.

(B) Because of the low viscosity properties and poor alcohol precipitability of gum arabic, it was made up at a concentratiton of about 13% by dissolving 9.4 grams in about 62 ml. of water by warming slightly and filtering to remove bits of bark, etc. To the filtrate was added 1 ml. of 10% sodium chloride and the mixture was added to 125 ml. of isopropyl alcohol. The precipitate was separated on Dacron cloth and aspirated under a rubber dam to a wet weight to 15 grams. This was mixed with 71.5 grams of DMF and dried by vacuum removal of most of the volatile liquids.

(C) Psyllium mucilage was prepared by intermittently stirring 15.4 grams of whole psyllium husks in one liter of water for three hours and centrifuging, after warming to 60° C. at 12,400 r.p.m. in a disc-bowl centrifuge to remove the bulk of the insoluble matter. The thick, nearly gelatinous centrifugate (842 grams) was reheated to 70° C. and added to 2 volumes of isopropyl alcohol after the addition of sodium chloride to 0.1% concentration. The resulting coagulum was pressed to 18.6 grams (estimated weight of dry mucilage based on trial run=8.1 grams) and dehydrated by evaporation of DMF from it in vacuo (117 ml. DMF used), but with retention of DMF.

(D) A solution of pectin was prepared from 9.34 grams pectin and 460 ml. of water. Alcohol precipitation was aided by the addition of 5 ml. of 10 N hydrochloric acid to the hot pectin sol. One liter of isopropyl alcohol was used. The shredded, pressed coagulum weighed 96.5 grams. After treatment with 137 grams of DMF and evaporation, a second evaporation was carried out with a few ml. of DMF to insure removal of alcohol and water, while leaving DMF in the coagulum.

The conditions maintained during the sulfation of the respective activated gums as abovedescribed in the presence of 2 moles of pyridine per mole of $DMF:SO_3$ are set forth in the following table:

| Gum | Weight, grams | Approximate number mmoles | Milliliters 1 M $DMF=SO_3$ | Temperature, °C. | Time, hours | Yield, grams | $SO_4$, percent |
|---|---|---|---|---|---|---|---|
| A. CMC | 10.9 | 50 | 50 | 70 | 4 | 9.85 | 20.4 |
| B. Gum arabic | 9.4 | 60 | 105 | 45 | 2 | 15.5 | 38.9 |
| C. Psyllium | 8.1 | 60 | 90 | 70 | 4 | 10.4 | 47.2 |
| D. Pectin | 9.3 | 50 | 50 | 55 | 4 | 10.8 | 28.5 |

Since the gums employed in this example are molecularly different from the gums of the preceding examples characterized by hexose units, the more general formula hereinabove mentioned was resorted to for calculating the DS according to the formula weight (FW) of the gum in question. The FW used in making the calculation and the resulting DS are shown in the following table:

| Gum | Data used for determining FW | FW gum | DS product |
|---|---|---|---|
| A. CMC | Substituted with $CH_2COONa$ to 0.7. | 218 | 0.59 |
| B. Gum arabic | 3 arabinose:1 rhamnose:3 galactose:1 Na glucuronate. | 153.5 | 1.05 |
| C. Psyllium | Range of galacturonic acid; xylose=1:9 to 1:36. Arbitrarily chose 1:22. | 135 | 1.33 |
| D. Pectin | Degree of methylation=67.5 | 186.8 | 0.80 |

The gums were tested in suspensions of cocoa in milk. This particularly type of test is considered to be a stringent one, in that of all the gums available only carrageenan possesses the necessary properties—the ability to suspend cocoa, the imparting of a rich, creamy mouth-feel, the introduction of a suitable viscosity, and a usage level which is economically feasible. Other gums have been used, but generally lack at least one of these properties. Therefore, the fact that sulfated gums prepared by the method herein disclosed work in a manner similar to carrageenan makes them extremely novel compounds.

The sodium carboxymethylcellulose sulfate was used in the preparation of a chocolate syrup which, when mixed with milk, provided a concentration of 700 p.p.m. of the derivative. After standing for about 18 hours at 50° F. the chocolate milk was examined. There was no trace of cocoa on the bottom of the bottle, and when the viscosity of the milk was checked using a Zahn cup the flow time was 41.6 seconds, i.e., within 2 seconds of a standard carrageenan-stabilized chocolate milk.

The sodium psyllium sulfate was similarly tested, but the proper usage level was not chosen. At 1000 p.p.m. the milk was slightly over-stabilized, having a flow time of 54.7 seconds, while at 600 p.p.m. it was slightly under-stabilized—some cocoa settled—and the flow time was only 27.3 seconds, Extrapolating from these values, a proper usage level was calculated to be about 820 p.p.m.

The psyllium sulfate was also tested in a milk shake application. A mixture of 20 grams of sugar, 2 grams of cocoa, 0.01 gram of artificial vanilla flavor and 0.35 gram of −270-mesh gum was added to 8 ozs. of milk. The mixture was shaken for 15 seconds, then poured out into a 400-ml. Berzelius beaker. The shake filled the beaker to the brim and retained the volume for over 5 minutes. The creaminess and mouth-feel were excellent and no cocoa settled. The usage level was only 70% of that of carrageenan employed in the same test.

Identical results were obtained when a similar mixture containing 0.50 gram of sodium pectin sulfate instead of psyllium sulfate was tested. Here, the usage level was the same as carrageenan, but the effectiveness of the synthetic material was clearly demonstrated.

Example 12

In the preceding examples of activation of the gums was carried out by forming relatively weak gum solutions and bringing about precipitation of the gums by admixture of the sols with miscible solvents in which the gums are not soluble. This example is illustrative of the practice of this invention when causing the gum to occur in the water-containing, water distended condition by absorption of water without going into solution, thereby avoiding the necessity for producing the gum particles by coagulation from a solution of the gum.

A solution of 30 ml. of DMF and 70 ml. of water was added to 8.1 grams of guar gum and the mixture warmed to 145° F. During this time the gum swelled appreciably due to its adsorption of water from the solvent mixture. The gum was separated from the liquid by filtration and the filtrate was found to contain 31% of DMF by its refractive index, providing the preferential removal of water from the solvent system. To the filtered gum was added 100 ml. of DMF. Vacuum distillation of the solvents to short of dryness left the gum in a more compact form than the precipitation method, but in an equally activated state. To the activated gum were added 17 ml. of pyridine and 92 ml. of 1.11 M $DMF:SO_3$ in DMF. Sulfation was carried out by heating the mixture at 70° C. for 4 hours. The sulfated gum was filtered off, washed with DMF and alcohol and dissolved in water with continuous neutralization. After alcohol precipitation, washing and drying 11.1 grams of sodium guar sulfate were obtained. It had a DS of 1.09 and a 1% water viscosity measured at 25° C., of 4240 cps.

Lower concentrations of DMF in the water (10% and 20%) permitted the gum to swell to a condition such that removal of the water was very difficult. On the other hand, concentrations in excess of 30% reduced the amount of swelling, and thus, activation: 40% DMF treatment led to a DS of only about 0.25, as did treatment with 50% DMF. Similar treatment with aqueous alcohol also resulted in activation but led to lower DS's, though this fact could be used to great advantage in the extreme case. Thus, 8.1 grams of guar powder was soaked in 100 ml. of 60% isopropyl alcohol under reflux for 15 minutes. The aqueous alcohol was removed by filtration and replaced by DMF which was mostly removed by vacuum distillation to ensure complete removal of the water and alcohol. The gum was then treated with 80 ml. of 1.3 M $DMF:SO_3$ and 17 ml. pyridine and heated at 70° C. for 1.5 hours. The sulfated gum was filtered off, dispersed in water, and neutralized with aqueous sodium hydroxide solution, then coagulated by adding the solution to isopropyl alcohol. After washing, drying and grinding, the product was analyzed and tested for its ability to produce a high viscosity. The 1% viscosity was 29,000 cps., which was over four times as great as the original guar gum used in its preparation. In another instance, the activation was carried out again with 60% isopropyl alcohol, but at room temperature for 14 hours. Sulfation was conducted for 4 hours at 70° C. This product was nearly identical, having a DS of 0.20, and a viscosity of 26,000 cps., which was about four times as great as the viscosity of the unsulfated guar from which it was made.

Example 13

Another technique also was found effective in using aqueous alcohol to prepare a highly concentrated guar gum solution prior to sulfation. A slurry of 8.1 grams of guar in 100 ml. of 50% (by weight) isopropyl alcohol was rapidly heated to a boil with stirring. The alcohol and part of the water evaporated in a few minutes. The resulting gum solution appeared as swollen granules. These were dispersed in 150 ml. of DMF and the mixture subjected to distillation to dehydrate the gum. Sulfation at 70° C. for four hours with the sulfating agent previously described, namely, $DMF:SO_3$ with 2 moles of pyridine per mole of $DMF:SO_3$ gave a guar sulfate with a DS of 1.46 and a 1% water viscosity of 3400 cps. Much lower concentrations of alcohol gave less satisfactory results. At 30%, however, DS of 1.25 and 850 cps.-viscosity resulted. At 40% a DS of 1.26 and a viscosity of 1450 cps. were produced after sulfation. At higher alcohol concentrations DS started to decrease—60% alcohol led to a DS of 0.88 (water viscosity, 5700 cps.); 70% alcohol, DS=0.21, viscosity 7300 cps.

Example 14

To further illustrate the applicability of swelling a gum in aqueous DMF and activating by solvent distillation, 8.1 grams of potato starch were soaked in warm 30% DMF and filtered off, then prepared for sulfation by mixing with anhydrous DMF and distilling in vacuo to remove all the solvents except a small residue of DMF to keep the starch moist. To the activated starch was added 92 ml. of 1.11 M $DMF:SO_3$ in DMF and 17 ml. of pyridine. The mixture was heated to 70° C. and maintained at that temperature for four hours. At the end of this period the gum was filtered off, dispersed in water with concomitant dissolving and neutralization. The neutral solution was concentrated to approximately one-half its volume and mixed with sufficient isopropyl alcohol to cause the sulfated gum to precipitate from solution. It was separated and washed three times with 85% alcohol and dried at 60° C. in a circulating air oven, yielding 13.7 grams of sodium starch sulfate having a DS of 1.87. Measured at 6 r.p.m. with the #2 spindle on a Brookfield Model LVF viscometer, a 1% solution of this material had a viscosity of 575 cps. at 25° C. and displayed a moderate degree of shear-sensitivity—at 60 r.p.m. its viscosity was 255 cps.

When 0.5 gram of this preparation was mixed with 20 grams of sugar and 2 grams of cocoa and the blend shaken with a cup of cold milk for 15 seconds, a rich, creamy milk shake resulted, and after one-half hour there was still no settling of the cocoa.

Example 15

This example serves to illustrate that dissolution of the sulfated gum is not necessary for neutralization with a metal hydroxide.

Guar gum was activated by precipitation of 8.1 grams of the gum from aqueous solution with 1.5 volumes of isopropyl alcohol and dehydration with DMF as in the previous examples. Sulfation was carried out with 2 moles of $DMF:SO_3$ per mole of hexose plus 2 moles of pyridine per mole of $DMF:SO_3$ as previously described at 70° C. for four hours. The reaction product was filtered off, but instead of being dissolved in water and neutralized with aqueous base it was simply suspended in 650 ml. of 70% isopropyl alcohol and neutralized therein with aqueous base. The results were quite comparable to similarly sulfated guar worked up by the dissolution-reprecipitation method: DS=1.27 and 1% water viscosity (25° C.)= 2610 cps.

Example 16

This example illustrates that sulfation can be carried out to a given extent by incorporating exactly the correct amount of sulfating reagent.

In most of the preceding examples an excess of sulfating reagent was employed. It had been demonstrated that a DS of 1.2–1.3 generally occurs when either 2 or 3 moles of sulfating reagent, namely, $DMF:SO_3$ plus 2 moles of pyridine per mole of $DMF:SO_3$ are employed with guar gum at a temperature of 70° C. for a time of four hours. Having established this DS as a "norm" for these conditions, 8.1 grams of guar gum (50 meq. of hexose) was activated as previously described and sulfated with 60 ml. of 1 M $DMF:SO_3$ in DMF plus 2 moles of pyridine per mole of $DMF:SO_3$ (60 meq., i.e., an amount calculated to produce a DS of 1.2) at 70° C. for four hours. A yield of 14.0 grams of sodium guar sulfate was obtained having a sulfate content of 40.62% (corrected for moisture). This is equivalent to a DS of 1.21, clearly indicating the efficiency of the sulfation procedure as practiced. A 1% solution of the product had a viscosity of 2660 cps. when measured at 6 r.p.m. on a Brookfield Model LVF viscometer.

Example 17

A solution of 32.4 grams of tara gum in 2.5 liters of water was added to 4.5 liters of 99% isopropyl alcohol, effecting the precipitation of the gum. The fibrous coagulum was squeezed out and admixed with 200 ml. of DMF, and the whole subjected to vacuum distillation on a rotary vacuum evaporator. Distillation was continued until the fibers were only damp with residual DMF. At this point 19.2 ml. of pyridine, 100 ml. of DMF, and 120 ml. of 1 M $DMF:SO_3$ in DMF were added and the mixture was shaken at room temperature for four hours. The sulfated gum was filtered off, washed with DMF and suspended in water. As it dissolved, neutrality was maintained by careful addition of 1 N sodium hydroxide solution. When solution and neutralization were complete the heated sol was added to sufficient alcohol to effect precipitation of the sulfated gum. This product, sodium tara sulfate, was washed with fresh alcohol, dried and ground in a laboratory Wiley mill. It had a DS of 0.37 and a 1% viscosity, measured at 25° C. on a Brookfield LVF viscometer at 6 r.p.m., of 1725 cps. It was tested in a toothpaste formulation in which carrageenan is normally used at a concentration of 1%. It proved to be a good binder at a concentration of only 0.65%, which is markedly less than carrageenan.

Example 18

A slurry of 8.1 grams of guar gum and 100 ml. of 30% DMF was warmed to 145° F. and the gum filtered off. Anhydrous DMF was added to the swollen gum and the mixture partially dried by vacuum removal of the solvents. To the swollen guar gum particles were then added 6.8 grams of anhydrous sodium acetate and 78 ml. of 1.11 M $DMF:SO_3$ solution. The mixture was held at 50° C. for two hours, then the solids were filtered off and dispersed in water with constant neutralization. Less base was required than when similar products were prepared using pyridine as a base. The sodium guar sulfate thus prepared had a DS of 0.60 and a 1% water viscosity of 3580 cps.

Example 19

A sulfation similar to Example 18 was carried out using 14.1 grams of anhydrous disodium phosphate in place of the sodium acetate. The reaction was carried out at 70° C. for one hour and the sulfated gum was slurried away from the denser sodium phosphate which settled to the bottom. The product had a DS of 0.59 and a 1% solution had a viscosity of 600 cps.

Example 20

This example indicates that it is possible to obtain substantial sulfation of gelatinized starch not only by employing prior to sulfation the technique of evaporation of water in the presence of a surrogate liquid but also by the technique of dehydration by washing with acetone and that in either case the viscosity-imparting characteristics of the sulfated starch are very greatly enhanced by carrying out the sulfation in the presence of a base.

A 5% solution of starch was prepared by dispersing a cold aqueous slurry of 56.7 g. of starch into 900 g. boiling distilled water and maintaining a temperature of 85–90° C. for 30 minutes. To this solution (1133 g.) was added 2266 ml. of acetone to precipitate the starch. The coagulum was stirred for about 10 minutes, then was separated from the liquid and squeezed out to a wet weight of 118 g. Exactly half of this was placed in a beaker and washed three times with 200-ml. portions of acetone, allowing a minimum of half an hour for each wash. The other half of the coagulum was placed in a 500-ml. round-bottomed flask and to it was added 200 ml. of DMF. The mixture was subjected to vacuum evaporation, starting with a bath temperature of 25° C. and a pressure of 5 mm.

The DMF-treated coagulum (44.6 g.) was divided into halves, each portion being placed in a 500-ml. round-bottomed flask (A and B).

The acetone-washed coagulum (37.0 g.) was also halved and each portion placed in a 500-ml. round-bottomed flask (C and D). To these flasks were added 47 ml. of DMF. They were placed on a mechanical shaker for 1 hour. After which, 100 ml. of 1.77 M DMF:$SO_3$ solution (in DMF) was added to flask C, and to flask D were added 28.5 ml. of pyridine and 100 ml. of 1.77 M DMF:$SO_3$ solution. The flasks were cooled to 25° C. and placed on the shaker for three hours. At the end of the three-hour period the contents of flask C were emptied into about 1 l. of ice and water containing BDH Universal Indicator, and 1 N sodium hydroxide solution was added rapidly, as required, to maintain a pH between 7 and 9 in the stirred solution. The contents of flask D, in which the gum had not entered solution at all (compared to C in which the solvent had become slightly viscous, indicating some gum was in solution), were poured into a sintered glass funnel and the gum separated by filtration. It was then washed with a little 99% isopropyl alcohol then dispersed in 1 l. of ice and water containing indicator as C and kept neutral by the addition of 1 N NaOH. When no more base was consumed by the two solutions, they were heated to about 50° C. and 1% of their respective volumes of 10% sodium chloride solution was added. The warm solutions were then added to 1.5 volumes of 85% isopropyl alcohol to effect separation of the product.

To flask A was added 47 ml. of DMF and 100 ml. of 1.77 M DMF:$SO_3$ solution. To flask B were added 47 ml. of DMF, 28.5 ml. of pyridine and 100 ml. of 1.77 M DMF:$SO_3$ solution, i.e., the complete procedure that normally is preferred. These flasks were placed on the shaker, after cooling to 25° C. for four hours. Their contents were worked up as with C and D: A as C, and B as D.

The coagula were separated from the alcohol the following day and washed once with 85% alcohol. Because of their extremely sticky nature, however, it was necessary to wash them with acetone before oven drying.

The following table indicates the results of these various experiments, as to yield, chemical nature and viscosity:

| | Evaporation dehydration in presence of DMF | | Acetone dehydration | |
|---|---|---|---|---|
| | A | B | C | D |
| | Base absent | Base present | Base absent | Base present |
| Yield, percent | [1] 177 | [2] 139 | [3] 135 | [4] 109 |
| $H_2O$, percent | 6.85 | 5.36 | 7.29 | 6.23 |
| Ash, percent | 32.93 | 21.55 | 36.78 | 26.56 |
| $SO_4$ (ester) percent | 43.80 | 30.27 | 47.80 | 37.36 |
| $SO_4$ (inorg.) percent | 0.95 | 0.15 | 1.67 | 0.22 |
| DS (anhyd. basis) | 1.59 | 0.82 | 1.92 | 1.17 |
| Vis., 1% 25° C., 6 r.p.m. (cps.) | | 850 | | 725 |
| Vis., 1% 25° C., 60 r.p.m. (cps.) | 6.6 | 344 | 8.1 | 313 |

[1] 25.0 grams.
[2] 19.7 grams.
[3] 19.1 grams.
[4] 15.4 grams.

The original starch had a viscosity of 70 cps. when tested the same way at 60 r.p.m.

The greatly increased viscosity characteristics of the starch which was subjected to sulfation in the presence of the base is apparent from the foregoing data. The base reacts with acid produced during sulfation by reaction of the sulfating agent with active hydroxyls present in the reaction mass and the presence of the base is important when sulfating a gum in a substantially dehydrated swollen activated condition since some residual water may be present in the swollen particles which results in the presence of active hydroxyls in addition to the active hydroxyls in the gum.

Example 21

This example illustrates that the technique of dehydration by evaporation in the presence of a surrogate liquid enabled the sulfation of guar gum to be successfully accomplished whereas little or no sulfation was obtained when the water-distented guar gum was dehydrated by washing with acetone. This example also illustrates the greatly enhanced viscosity characteristics that are obtainable when the sulfation is carried out in the presence of a base.

A 1.6% solution of guar gum was prepared by dispersing 56.7 g. of guar in 3500 ml. of water with stirring. When the solution became quite viscous, it was immersed in a boiling water bath and stirring continued for an additional half hour. The hot solution was then poured into 7 l. of 99% isopropyl alcohol and the resulting coagulum shredded by hand. It was then stirred in the alcohol for about 20 minutes and left overnight. The following day it was separated from the liquid and squeezed out to a weight 166 g.

Half of this was transferred to a beaker and washed three times with 200-ml. portions of acetone, a minimum time of 30 minutes being used each time. After draining and squeezing out the coagulum in Dacron cloth following the third wash, it weighed 98 g. Half of this was placed in each of two 500-ml. round-bottom flasks labeled C and D, respectively.

The other half of the alcohol-wet coagulum was again divided into halves, each of which was placed in 500-ml. round-bottom flasks (A and B) and treated with 100 ml. of DMF. The DMF mixtures were then subjected to vacuum distillation, 30 mm. at 23° C. to 4 mm. at 80° C. The coagulum in flask. A weighed 31.9 g., in B, 39.9 g., after the evaporation.

The four samples A, B, C and D were then treated exactly as the corresponding samples in the case of Example 20, with the exception that A and B were sulfated at 40° C. instead of 25° C.

The following table gives the pertinent data regarding the four samples:

|  | Evaporation dehydration in presence of DMF | | Acetone dehydration | |
| --- | --- | --- | --- | --- |
|  | A | B | C | D |
|  | Base absent | Base present | Base absent | Base present |
| Yield, percent | ¹119 | ²123 | ²124 | ³96 |
| H₂O, percent | 8.02 | 7.05 | 5.84 | 5.96 |
| Ash, percent | 34.55 | 15.76 | 19.63 | 5.17 |
| SO₄ (ester) percent | 45.39 | 22.10 | 9.80 | 3.16 |
| SO₄ (inorg.) percent | 1.87 | 0.15 | 8.11 | 2.00 |
| DS (anhyd. basis) | 1.75 | 0.54 | 0.20 | 0.06 |
| Vis., 1% 25° C., 6 r.p.m. (cps.) |  | 3,200 | 175 | 3,400 |
| Vis., 1% 25° C., 60 r.p.m. (cps.) | 4.6 | 1,240 | 158 | 1,520 |

¹ 16.9 grams.
² 17.5 grams.
³ 13.6 grams.

The viscosity of the untreated guar was about 6500 cps. at 6 r.p.m. and about 6000 cps. at 60 r.p.m.

As indicated by the foregoing data, the water-distended guar which was dehydrated by washing with acetone was highly resistant to sulfation, the sulfating conditions accomplishing little else than a substantial degradation of the gum. When employing the technique of evaporation in the presence of a surrogate liquid, the effective sulfation occurred very successfully. In the absence of the base, the viscosity of a 1% solution of the sulfated gum at 25° C., 60 r.p.m. was 4.6 cps. Such a sulfated gum is useful, e.g. for use in ulcer therapy or for use as a suspending agent when little thickening is desired. A high order of viscosity-imparting properties in combination with very substantial sulfation was obtainable when the gum was sulfated in the presence of a base.

Example 22

This example illustrates that in order to obtain the improvements which are obtained in the practice of this invention by the dehydration of a water-distended gum in the presence of and with retention of a surrogate liquid which is non-reactive with the sulfating agent, the initial production of the gum in the water-distended condition is essential. Treatment with a material such as DMF followed by partial evaporation of the DMF prior to sulfation, the water-swelling step being omitted, resulted in a virtually complete absence of any sulfation.

21.6 g. of locust bean gum was taken up with 100 ml. of DMF and the solvent was evaporated under vacuum until no more vapors came over in the condenser. The weight of the recovered gum was 29.5 g.

7.35 g. of the treated gum was taken in a 3-necked round-bottomed flask fitted with stirrer, gas inlet and bubble tube. 100 ml. of anhydrous DMF was added. To this was added 16.0 ml. of anhydrous pyridine. Thhe reaction mixture was stirred and over a four-hour period 100 ml. of 1.119 M DMF:SO₃ reagent was added at room temperature. At the end of the reaction time the reaction mixture was filtered and washed twice with anhydrous DMF.

The gum solid from the funnel was placed in a 1500-ml. beaker. 16 ml. of anhydrous pyridine was added, then with vigorous agitation 1000 ml. of distilled water. The reaction was kept slightly pink to phenolphthalein indicator requiring 4 ml. of 1 N NaOH over the course of the gum dissolution. Heating at 95° C. was required for complete gum solubility. 10 cc. of 10% NaCl solution was added and the gum solution coagulated in 2 liters of 85% isopropyl alcohol. The coagulum was then washed three successive times with 85% isopropyl alcohol and dried, yielding 4.28 grams.

The properties of the recovered gum were as follows:

Viscosity—3300 cps.—25° C. (1% heated and cooed).
H₂O—3.74%.
SO₄ (ester)—0.99%.
Ash—1.71%.
Free SO₄ (inorgan.)—0.32%.

The ester sulfate content of only 0.99% indicates that the absence of sulfation was essentially complete.

Example 23

The significance of this example is analogous to that of Example 22 except that potato starch was employed instead of locust bean gum.

10.8 g. of potato starch was taken up in 200 ml. of DMF. The mixture was evaporated as in Example 22. The starch then was treated with 32 ml. of dry pyridine and 200 ml. of 1.119 M DMF:SO₃ reagent and stirred overnight at room temperature. The reaction mixture was worked up on a funnel and washed three times as in Example 22.

Attempts to dissolve the material from the reaction in cold water failed as did attempts at heating the cold dispersed material for 2 hours at 95–100° C.

No metachromasia was observed on either the recovered material or on the original starch, thereby indicating that there had not been any appreciable sulfation.

Example 24

Efforts to sulfate a gum such as cellulose with a known sulfating agent but without pretreatment resulted in sulfation that was essentially nil.

5.4 g. of cotton was taken up with 32 ml. of pyridine plus 200 ml. of DMF:SO₃ reagent (1.119 M). The reaction was left overnight at room temperature (20 hours). At the end of the reaction time the cotton was filtered off and washed three times as in Example 22, yielding 4.0 g.

Attempts to solubilize the cotton in water failed.

Treatment of the cotton from the reaction mixture after drying with methylene blue indicated slight metachromasia.

Similar treatment of the starting cotton gave no metachromasia. The extent of sulfation was assessed to be essentially nil.

It is apparent from the foregoing that by the technique of first producing a carbohydrate gum in a water-distended condition and then dehydrating it in the presence of a surrogate liquid which is carried into the sulfation reaction, an improved procedure is provided which has general applicability to the various carbohydrate gums in enabling them to be readily hydrated even in the case of gums that are otherwise highly resistant to sulfation.

It also is apparent that in carrying out sulfation reaction the presence of a base is conducive to obtaining greatly increased viscosity-imparting characteristics and that this is of especial importance and significance when sulfation is accomplished utilizing as the sulfating agent the complex formed between SO₃ and an amide. Optimum sulfating conditions for most contemplated uses are afforded when the technique of dehydration by evaporation in the presence of a surrogate is followed by sulfation in the presence of a base.

We claim:

1. In a process of sulfating a carbohydrate gum wherein the gum in swollen, substantaily dehydrated activated condition is subjected to sulfation under substantially anhydrous conditions by means of a sulfating agent in the form of a product of reaction between SO₃ and a Lewis base dissolved in a liquid that is a solvent therefor with attendant formation during the sulfation reaction of an acid reaction product produced by reaction of the sulfating agent with active hydroxyls present in the reaction mass, the improvement which comprises sulfating the swollen dehydrated activated gum with said sulfating agent in the presence of a base which does not react irreversibly with said sulfating agent and which is capable of accepting protons from said acid reaction product, said base being present in an amount which reduces the content of said acid reaction product in the reaction mixture as said reaction proceeds so as to be less than if said base were not present thereby substantially reducing the degradative effect of said acid reaction product on said gum during the progress of the sulfation reaction.

2. A process according to claim 1 wherein the quantity of said base is at least that which is reactive with substantially all of said acid reaction product that is formed during the sulfation reaction.

3. A process according to claim 1 wherein said sulfating agent is in the form of a complex of $SO_3$ with an amide selected from the group consisting of N,N-dimethylformamide, dimethylacetamide, formamide and diethylformamide.

4. A process according to claim 1 wherein said gum is starch.

5. A process according to claim 1 wherein said gum is cellulose.

6. A process according to claim 1 wherein the sulfation of the gum is carried out at a temperature that is maintained substantially constant and the sulfation is continued until the DS is about that which is the maximum DS attainable by said gum at said temperature irrespective of the presence of an excess of the sulfating agent, the amount of sulfating agent being an amount which is at least equal to that which is required for effecting said DS thereby determining the DS of the gum according to the temperature employed.

7. A process according to claim 1 wherein said carbohydrate gum is locust bean gum.

8. A process according to claim 1 wherein said carbohydrate gum is guar.

9. A process according to claim 1 wherein said carbohydrate gum is carboxymethyl cellulose.

10. A process according to claim 1 wherein said carbohydrate gum is agarose.

11. A process according to claim 1 wherein said carbohydrate gum is psyllium mucilage.

12. A process according to claim 1 wherein said carbohydrate gum is tara.

13. A process according to claim 1 wherein said carbohydrate gum is pectin.

14. A synthetically sulfated carbohydrate gum selected from the group consisting of locust bean gum and guar which has a DS from about 0.3 to about 1.8 and the viscosity in centipoises of a 1% water solution of which at 25° C. is not less than about one-tenth that of the unsulfated gum.

15. A synthetically sulfated carbohydrate gum selected from the group consisting of locust bean gum and guar which has a DS of from about 0.1 to about 0.3 and the viscosity in centipoises of a 1% water solution of which at 25° C. is greater than that of the unsulfated gum.

16. Synthetically sulfated agarose having a DS of at least about 0.3.

17. In a process of sulfating a carbohydrate gum wherein the gum is subjected to substantially anhydrous sulfation by means of a sulfating agent in the form of a product of reaction between $SO_3$ and a Lewis base dissolved in a liquid that is a solvent for said reaction product and the sulfated gum thereafter is recovered, the improvement which comprises forming a slurry of water-containing water-distended particles of said gum in a surrogate liquid which is selected from the group consisting of N,N-dimethylformamide, pyridine, formamide, dimethylsulfoxide, dimethylacetamide, diethylformamide, picolines and lutadines, which is miscible with or is the same as the solvent for the sulfating agent and which has a vapor pressure lower than that of any liquid carried by said particles that is capable during the sulfation reaction of reaction with a substantial amount of said sulfating agent to remove it from the reaction mixture, evaporating liquid from said slurry by conversion of said liquid to vapor released from said slurry into atmosphere in contact therewith until the gum particles are substantially free of water and of any other liquid capable during the sulfation reaction of reacting with the sulfating agent to remove it from the sulfation reaction mixture but leaving an amount of said surrogate liquid in and among the gum particles that is at least about half the weight of the gum, said gum particles carrying said surrogate liquid therewith thereafter being commingled with said sulfating agent and subjected to sulfation by reaction therewith.

18. A process according to claim 17 wherein the Lewis base is a tertiary amine dimethylsulfoxide, or an amide selected from the group consisting of N,N-dimethylformamide, dimethylacetamide, formamide and diethylformamide.

19. A process according to claim 17 wherein the reaction product between $SO_3$ and a Lewis base is dissolved in a solvent selected from the group consisting of N,N-dimethylformamide, pyridine, formamide, dimethylsulfoxide, dimethylacetamide, diethylformamide, picolines and lutadines.

20. A process according to claim 17 wherein evaporation of liquid from the slurry is carried out under vacuum.

21. A process according to claim 17 wherein the sulfation of the gum is carried out at a temperature that is maintained substantially constant and the sulfation is continued until the DS is about that which is the maximum DS attainable by said gum at said temperature irrespective of the presence of an excess of the sulfating agent, the amount of sulfating agent being an amount which is at least equal to that which is required for effecting said DS thereby determining the DS of the gum according to the temperature employed.

22. A process according to claim 17 wherein the surrogate liquid is a liquid that is essentially identical with liquid comprised in the solvent for the sulfating agent during the sulfation step.

23. A process according to claim 17 wherein the surrogate liquid is N,N-dimethylformamide and N,N-dimethylformamide is comprised in the solvent for the sulfating agent.

24. A process according to claim 17 wherein said surrogate liquid is pyridine and wherein the sulfation is carried out using as the sulfating agent the complex reaction product of reaction between $SO_3$ and a tertiary amine, dimethylsulfoxide or an amide selected from the group consisting of N,N-dimethylformamide, formamide, dimethylacetamide, and diethylformamide, said complex product of reaction being dissolved in N,N-dimethylformamide and wherein the sulfation is carried out in the presence of pyridine.

25. A process according to claim 17 wherein said water-containing water-distended particles of said gum are produced by dissolving said gum in an aqueous medium to form a solution thereof that is liquid, coagulating the gum from the liquid solution and separating the coagulated gum from excess supernatant liquid without drying the gum.

26. A process according to claim 17 wherein said water-containing water-distended gum is produced by contacting the gum in a solid particulate state with an aqueous medium in which the particles are not dissolved but become swollen by water taken up thereby while remaining in substantially discrete condition and separating the swollen particles from excess liquid medium without drying the swollen particles.

27. A process according to claim 26 wherein said gum is a water-soluble gum and particles of said gum are swollen while in contact with an aqueous medium containing a sufficient quantity of a water-miscible liquid in which the gum is insoluble to prevent the gum from going into solution.

28. A process according to claim 27 wherein the swelling of the gum is carried out at elevated temperatures.

29. A process according to claim 28 wherein the water-miscible liquid in which the gum is insoluble has a vapor pressure greater than that of water and most of it is flashed off prior to slurrying the swollen particles with the surrogate liquid.

30. A process according to claim 29 wherein the gum is starch and the aqueous medium in which the starch is swollen is heated sufficiently to open up the starch and permit swelling.

31. A process according to claim 29 wherein the gum is guar and the aqueous medium in which the guar is swollen is heated sufficiently to open up the guar and permit swelling.

32. In a process of sulfating a carbohydrate gum wherein the gum is subjected to substantially anhydrous sulfation by means of a sulfating agent in the form of a reaction product between $SO_3$ and an amide selected from the group consisting of N,N-dimethylformamide, dimethylacetamide, formamide and diethylformamide dissolved in a liquid selected from the group consisting of N,N-dimethylformamide, pyridine, formamide, dimethylsulfoxide, dimethylacetamide, diethylformamide, picolines and lutadines and the sulfated gum thereafter is recovered, the improvement which comprises forming a slurry of water-containing water-distended particles in a surrogate liquid selected from the group consisting of N,N-dimethylformamide, pyridine, formamide, dimethylsulfoxide, dimethylacetamide, diethylformamide, picolines and lutadines, said surrogate liquid having a vapor pressure lower than that of any liquid carried by said particles that is capable during the sulfation reaction of reaction with a substantial amount of said sulfating agent to remove it from the reaction mixture, evaporating liquid from said slurry by conversion of said liquid to vapor released from said slurry into atmosphere in contact therewith until the gum particles are substantially free of water and of any liquid capable during the sulfation of reaction with the sulfating agent but leaving an amount of said surrogate liquid in and among said gum particles that is at least about half the weight of the gum, the gum particles carrying said surrogate liquid therewith thereafter being commingled with the sulfating agent and subjected to sulfation by reaction therewith.

33. A process according to claim 32 where said sulfation reaction is attended with the formation of an acid reaction product produced by reaction of the sulfating agent with active hydroxyls in the reaction mass and which comprises including in the reaction mass so that sulfation reaction occurs in the presence thereof a base which does not react irreversibly with said sulfating agent and which accepts protons from said acid reaction product, said base being present in an amount which during the progress of the sulfation reaction reduces the content of said acid reaction product in the reaction mass so as to be less than if said base were not present, thereby substantially reducing the degradative effect of said acid reaction product on said gum during the progress of the sulfation reaction.

34. In a process of sulfating a carbohydrate gum wherein the gum is subjected to substantially anhydrous sulfation by means of sulfating agent in the form of a product of reaction between $SO_3$ and a Lewis base dissolved in a liquid that is a solvent for said reaction product and the sulfated gum thereafter is recovered, the improvement which comprises forming a slurry of water-containing water-distended particles of said gum in a surrogate liquid which is selected from the group consisting of N,N-dimethylformamide, pyridine, formamide, dimethylsulfoxide dimethylacetamide, diethylformamide, picolines and lutadines, which is miscible with or is the same as the solvent for the sulfating agent, and which has a vapor pressure lower than that of any liquid carried by said particles that is capable during the sulfation reaction of reaction with a substantial amount of said sulfating agent to remove it from the reaction mixture, evaporating liquid from said slurry by conversion of said liquid to vapor released from said slurry into atmosphere in contact therewith until the gum particles are substantially free of water and of any other liquid capable during the sulfation reaction of reacting with the sulfating agent to remove it from the sulfation reaction mixture but leaving an amount of said surrogate liquid in and among the gum particles that is at least about half the weight of the gum, thereafter commingling the particles carrying said surrogate liquid with said sulfating agent, subjecting said particles carrying said surrogate liquid to sulfation by reaction of said particles with said sulfating agent with attendant formation of an acid reaction product produced by reaction of the sulfating agent with active hydroxyls present in the reaction mass and including in the reaction mass so that said sulfation reaction occurs in the presence thereof a base which does not react irreversibly with said sulfating agent and which accepts protons from said acid reaction product, said base being present in an amount which during the progress of the reaction reduces the content of said acid reaction product in the reaction mass so as to be less than if said base were not present thereby substantially reducing the degradative effect of said acid reaction product on said gum during the progress of the sulfation reaction.

35. A process according to claim 34 wherein the quantity of said base is at least that which is reactive with substantially all of said acid formed during the sulfation reaction.

36. A process according to claim 34 wherein said gum is cellulose and is produced in water-containing water-distended condition by dissolving the cellulose in a solution of a cuprammonium salt and coagulating the dissolved cellulose from said solution by adding the cellulose solution to an aqueous liquid containing sufficient acid to coagulate the gum, excess supernatant liquid being separated from the coagulated cellulose without drying it.

References Cited

UNITED STATES PATENTS

| | | | |
|---|---|---|---|
| 2,967,178 | 1/1961 | Kerr et al. | 260—233.5 |
| 3,174,904 | 3/1965 | Sawhill | 167—74 |
| 3,176,003 | 3/1965 | Stancioff | 260—209 |
| 3,378,541 | 4/1968 | Colquhoun et al. | 260—209 |
| 3,386,992 | 6/1968 | Schweiger | 260—234 |
| 3,401,160 | 9/1968 | Schweiger | 260—233.5 |
| 3,507,855 | 4/1970 | Whistler | 260—215 |
| 3,527,810 | 9/1970 | Pettitt | 260—607 |
| 3,528,963 | 9/1970 | Reid | 260—215 |

FOREIGN PATENTS

| | | | |
|---|---|---|---|
| 1,110,335 | 4/1968 | Great Britain | 260—215 |

DONALD E. CZAJA, Primary Examiner

M. I. MARQUIS, Assistant Examiner

U.S. Cl. X.R.

99—25; 260—209 R, 209.6, 215, 226, 231 R, 233.5, 234 R; 424—56